(12) United States Patent  
Krah et al.

(10) Patent No.: US 9,176,604 B2
(45) Date of Patent: Nov. 3, 2015

(54) STYLUS DEVICE

(75) Inventors: Christoph Horst Krah, Los Altos, CA (US); Marduke Yousefpor, San Jose, CA (US); Kevin J. White, Los Gatos, CA (US); Martin Paul Grunthaner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 13/560,953

(22) Filed: Jul. 27, 2012

(65) Prior Publication Data

US 2014/0028634 A1    Jan. 30, 2014

(51) Int. Cl.
*G06F 3/033* (2013.01)
*G06F 3/0354* (2013.01)
*G06F 3/041* (2006.01)
*G06F 3/044* (2006.01)

(52) U.S. Cl.
CPC ............ *G06F 3/03545* (2013.01); *G06F 3/033* (2013.01); *G06F 3/041* (2013.01); *G06F 3/044* (2013.01)

(58) Field of Classification Search
None
See application file for complete search history.

(56) References Cited

U.S. PATENT DOCUMENTS

| | | |
|---|---|---|
| 3,970,846 A | 7/1976 | Schofield et al. |
| 4,220,815 A | 9/1980 | Gibson et al. |
| 4,281,407 A | 7/1981 | Tosima |
| 4,289,927 A | 9/1981 | Rodgers |
| 4,320,292 A | 3/1982 | Oikawa et al. |
| 4,334,219 A | 6/1982 | Paülus et al. |
| 4,345,248 A | 8/1982 | Togashi et al. |
| 4,405,921 A | 9/1983 | Mukaiyama |
| 4,439,855 A | 3/1984 | Dholakia |
| 4,476,463 A | 10/1984 | Ng et al. |
| 4,481,510 A | 11/1984 | Hareng et al. |

(Continued)

FOREIGN PATENT DOCUMENTS

| | | |
|---|---|---|
| DE | 036 02 796 A1 | 8/1987 |
| DE | 197 20 925 A1 | 12/1997 |

(Continued)

OTHER PUBLICATIONS

"Brightbonnet iPhone Stylus Has Bendy Tip for Better Dragging Action," Gizmodo.com, http://qizmodo.com/391639/brightbonnet-iphone-stylus-has-bendy-tip-for-better-dragging-action, Jul. 9, 2008.

(Continued)

*Primary Examiner* — Srilakshmi K Kumar
*Assistant Examiner* — Stephen T Reed
(74) *Attorney, Agent, or Firm* — Morrison & Foerster LLP

(57) ABSTRACT

Styluses capable of generating stylus stimulation signals and touch sensitive devices capable of receiving stylus stimulation signals are disclosed. In one example, a stylus can receive a stimulation signal from a touch sensor of a touch sensitive device and generate a stylus stimulation signal by changing an amplitude or frequency of the received stimulation signal. The stylus can transmit the stylus stimulation signal back into the touch sensor of the touch sensitive device. The touch sensor can generate a touch signal based on the device's own stimulation signals and the stylus stimulation signal. The touch sensitive device can process the touch signal to determine a location of the stylus on the touch sensor. The stylus can include a force sensor to detect an amount of force applied to a tip of the stylus. The stylus stimulation signal can be modulated based on the force detected by the force sensor.

8 Claims, 13 Drawing Sheets

(56) References Cited

U.S. PATENT DOCUMENTS

| | | |
|---|---|---|
| 4,484,179 A | 11/1984 | Kasday |
| 4,490,607 A | 12/1984 | Pease et al. |
| 4,496,981 A | 1/1985 | Ota |
| 4,520,357 A | 5/1985 | Castleberry et al. |
| 4,542,375 A | 9/1985 | Alles et al. |
| 4,602,321 A | 7/1986 | Bornhorst |
| 4,603,356 A | 7/1986 | Bates |
| 4,642,459 A | 2/1987 | Casewell et al. |
| 4,644,338 A | 2/1987 | Aoki et al. |
| 4,655,552 A | 4/1987 | Togashi et al. |
| 4,662,718 A | 5/1987 | Masubuchi |
| 4,671,671 A | 6/1987 | Suetaka |
| 4,677,428 A | 6/1987 | Bartholow |
| 4,679,909 A | 7/1987 | Hamada et al. |
| 4,684,939 A | 8/1987 | Streit |
| 4,698,460 A | 10/1987 | Krein et al. |
| 4,705,942 A | 11/1987 | Budrikis et al. |
| 4,720,869 A | 1/1988 | Wadia |
| 4,736,203 A | 4/1988 | Sidlauskas |
| 4,740,782 A | 4/1988 | Aoki et al. |
| 4,749,879 A | 6/1988 | Peterson et al. |
| 4,759,610 A | 7/1988 | Yanagisawa |
| 4,767,192 A | 8/1988 | Chang et al. |
| 4,772,101 A | 9/1988 | Liu |
| 4,782,327 A | 11/1988 | Kley et al. |
| 4,782,328 A | 11/1988 | Denlinger |
| 4,785,564 A | 11/1988 | Gurtler |
| 4,794,634 A | 12/1988 | Torihata et al. |
| 4,814,760 A | 3/1989 | Johnston et al. |
| 4,823,178 A | 4/1989 | Suda |
| 4,838,655 A | 6/1989 | Hunahata et al. |
| 4,846,559 A | 7/1989 | Kniffler |
| 4,877,697 A | 10/1989 | Vollmann et al. |
| 4,893,120 A | 1/1990 | Doering et al. |
| 4,904,056 A | 2/1990 | Castleberry |
| 4,917,474 A | 4/1990 | Yamazaki et al. |
| 4,940,901 A | 7/1990 | Henry et al. |
| 5,003,356 A | 3/1991 | Wakai et al. |
| 5,037,119 A | 8/1991 | Takehara et al. |
| 5,039,206 A | 8/1991 | Wiltshire |
| 5,051,570 A | 9/1991 | Tsujikawa et al. |
| 5,063,379 A | 11/1991 | Fabry et al. |
| 5,083,175 A | 1/1992 | Hack et al. |
| 5,105,186 A | 4/1992 | May |
| 5,113,041 A | 5/1992 | Blonder et al. |
| 5,117,071 A | 5/1992 | Greanias et al. |
| 5,140,153 A | 8/1992 | Heikkinen et al. |
| 5,151,688 A | 9/1992 | Tanaka et al. |
| 5,153,420 A | 10/1992 | Hack et al. |
| 5,172,104 A | 12/1992 | Tanigaki et al. |
| 5,182,661 A | 1/1993 | Ikeda et al. |
| 5,204,661 A | 4/1993 | Hack et al. |
| 5,236,850 A | 8/1993 | Zhang |
| 5,237,314 A | 8/1993 | Knapp |
| 5,243,332 A | 9/1993 | Jacobson |
| 5,276,538 A | 1/1994 | Monji et al. |
| 5,301,048 A | 4/1994 | Huisman |
| 5,308,964 A | 5/1994 | Kwon |
| 5,339,090 A | 8/1994 | Crossland et al. |
| 5,339,091 A | 8/1994 | Yamazaki et al. |
| 5,341,133 A | 8/1994 | Savoy et al. |
| 5,349,174 A | 9/1994 | Van Berkel et al. |
| 5,360,426 A | 11/1994 | Muller et al. |
| 5,369,262 A | 11/1994 | Dvorkis et al. |
| 5,376,948 A | 12/1994 | Roberts |
| 5,381,251 A | 1/1995 | Nonomura et al. |
| 5,386,543 A | 1/1995 | Bird |
| 5,387,445 A | 2/1995 | Horiuchi et al. |
| 5,392,058 A | 2/1995 | Tagawa |
| 5,414,283 A | 5/1995 | den Boer et al. |
| 5,422,693 A | 6/1995 | Vogeley et al. |
| 5,430,462 A | 7/1995 | Katagiri et al. |
| 5,445,871 A | 8/1995 | Murase et al. |
| 5,446,564 A | 8/1995 | Mawatari et al. |
| 5,461,400 A | 10/1995 | Ishii et al. |
| 5,475,398 A | 12/1995 | Yamazaki et al. |
| 5,483,261 A | 1/1996 | Yasutake |
| 5,483,263 A | 1/1996 | Bird et al. |
| 5,485,177 A | 1/1996 | Shannon et al. |
| 5,488,204 A | 1/1996 | Mead et al. |
| 5,502,514 A | 3/1996 | Vogeley et al. |
| 5,510,916 A | 4/1996 | Takahashi |
| 5,515,186 A | 5/1996 | Fergason et al. |
| 5,525,813 A | 6/1996 | Miyake et al. |
| 5,532,743 A | 7/1996 | Komobuchi |
| 5,559,471 A | 9/1996 | Black |
| 5,568,292 A | 10/1996 | Kim |
| 5,581,378 A | 12/1996 | Kulick et al. |
| 5,585,817 A | 12/1996 | Itoh et al. |
| 5,589,961 A | 12/1996 | Shigeta et al. |
| 5,598,004 A | 1/1997 | Powell et al. |
| 5,610,629 A | 3/1997 | Baur |
| 5,635,982 A | 6/1997 | Zhang et al. |
| 5,637,187 A | 6/1997 | Takasu et al. |
| 5,652,600 A | 7/1997 | Khormaei et al. |
| 5,659,332 A | 8/1997 | Ishii et al. |
| 5,677,744 A | 10/1997 | Yoneda et al. |
| 5,709,118 A | 1/1998 | Ohkubo |
| 5,712,528 A | 1/1998 | Barrow et al. |
| 5,734,491 A | 3/1998 | Debesis |
| 5,751,453 A | 5/1998 | Baur |
| 5,757,522 A | 5/1998 | Kulick et al. |
| 5,766,493 A | 6/1998 | Shin |
| 5,767,623 A | 6/1998 | Friedman et al. |
| 5,774,602 A | 6/1998 | Taguchi et al. |
| 5,777,713 A | 7/1998 | Kimura |
| 5,778,108 A | 7/1998 | Coleman, Jr. |
| 5,790,106 A | 8/1998 | Hirano et al. |
| 5,793,342 A | 8/1998 | Rhoads |
| 5,796,121 A | 8/1998 | Gates |
| 5,796,473 A | 8/1998 | Murata et al. |
| 5,812,109 A | 9/1998 | Kaifu et al. |
| 5,816,225 A | 10/1998 | Koch et al. |
| 5,818,037 A | 10/1998 | Redford et al. |
| 5,818,553 A | 10/1998 | Koenck et al. |
| 5,818,956 A | 10/1998 | Tuli |
| 5,825,352 A | 10/1998 | Bisset et al. |
| 5,831,693 A | 11/1998 | McCartney, Jr. et al. |
| 5,834,765 A | 11/1998 | Ashdown |
| 5,835,079 A | 11/1998 | Shieh |
| 5,838,290 A | 11/1998 | Kuijk |
| 5,838,308 A | 11/1998 | Knapp et al. |
| 5,852,487 A | 12/1998 | Fujimori et al. |
| 5,877,735 A | 3/1999 | King et al. |
| 5,880,411 A | 3/1999 | Gillespie et al. |
| 5,883,715 A | 3/1999 | Steinlechner et al. |
| 5,890,799 A | 4/1999 | Yiu et al. |
| 5,902,968 A | 5/1999 | Sato et al. |
| 5,905,489 A | 5/1999 | Takahama et al. |
| 5,917,464 A | 6/1999 | Stearns |
| 5,920,309 A * | 7/1999 | Bisset et al. ............... 345/173 |
| 5,920,360 A | 7/1999 | Coleman, Jr. |
| 5,923,320 A | 7/1999 | Murakami et al. |
| 5,926,238 A | 7/1999 | Inoue et al. |
| 5,930,591 A | 7/1999 | Huang |
| 5,940,049 A | 8/1999 | Hinman et al. |
| 5,942,761 A | 8/1999 | Tuli |
| 5,959,617 A | 9/1999 | Bird et al. |
| 5,959,697 A | 9/1999 | Coleman, Jr. |
| 5,962,856 A | 10/1999 | Zhao et al. |
| 5,966,108 A | 10/1999 | Ditzik |
| 5,973,312 A | 10/1999 | Curling et al. |
| 5,990,980 A | 11/1999 | Golin |
| 5,990,988 A | 11/1999 | Hanihara et al. |
| 5,995,172 A | 11/1999 | Ikeda et al. |
| 6,020,590 A | 2/2000 | Aggas et al. |
| 6,020,945 A | 2/2000 | Sawai et al. |
| 6,023,307 A | 2/2000 | Park |
| 6,028,581 A | 2/2000 | Umeya |
| 6,049,428 A | 4/2000 | Khan et al. |
| 6,061,177 A | 5/2000 | Fujimoto |
| 6,067,062 A | 5/2000 | Takasu et al. |
| 6,067,140 A | 5/2000 | Woo et al. |
| 6,069,393 A | 5/2000 | Hatanaka et al. |

(56) References Cited

U.S. PATENT DOCUMENTS

| | | |
|---|---|---|
| 6,078,378 A | 6/2000 | Lu et al. |
| 6,087,599 A | 7/2000 | Knowles |
| 6,100,538 A | 8/2000 | Ogawa |
| 6,118,435 A | 9/2000 | Fujita et al. |
| 6,133,906 A | 10/2000 | Geaghan |
| 6,133,907 A | 10/2000 | Liu |
| 6,163,313 A | 12/2000 | Aroyan et al. |
| 6,177,302 B1 | 1/2001 | Yamazaki et al. |
| 6,181,394 B1 | 1/2001 | Sanelle et al. |
| 6,182,892 B1 | 2/2001 | Angelo et al. |
| 6,184,863 B1 | 2/2001 | Sibert et al. |
| 6,184,873 B1 | 2/2001 | Ward |
| 6,188,391 B1 | 2/2001 | Seely et al. |
| 6,188,781 B1 | 2/2001 | Brownlee |
| 6,208,330 B1 | 3/2001 | Hasegawa et al. |
| 6,232,607 B1 | 5/2001 | Huang |
| 6,236,053 B1 | 5/2001 | Shariv |
| 6,236,063 B1 | 5/2001 | Yamazaki et al. |
| 6,242,729 B1 | 6/2001 | Izumi et al. |
| 6,262,408 B1 | 7/2001 | Izumi et al. |
| 6,265,792 B1 | 7/2001 | Granchukoff |
| 6,271,813 B1 | 8/2001 | Palalau |
| 6,278,423 B1 | 8/2001 | Wald et al. |
| 6,278,444 B1 | 8/2001 | Wilson et al. |
| 6,284,558 B1 | 9/2001 | Sakamoto |
| 6,295,113 B1 | 9/2001 | Yang |
| 6,300,977 B1 | 10/2001 | Waechter |
| 6,310,610 B1 | 10/2001 | Beaton et al. |
| 6,316,790 B1 | 11/2001 | Kodaira et al. |
| 6,320,617 B1 | 11/2001 | Gee et al. |
| 6,323,490 B1 | 11/2001 | Ikeda et al. |
| 6,323,846 B1 | 11/2001 | Westerman et al. |
| 6,326,956 B1 | 12/2001 | Jaeger et al. |
| 6,327,011 B2 | 12/2001 | Kim |
| 6,327,376 B1 | 12/2001 | Harkin |
| 6,351,076 B1 | 2/2002 | Yoshida et al. |
| 6,351,260 B1 | 2/2002 | Graham et al. |
| 6,357,939 B1 | 3/2002 | Baron |
| 6,364,829 B1 | 4/2002 | Fulghum |
| 6,377,249 B1 | 4/2002 | Mumford |
| 6,380,995 B1 | 4/2002 | Kim |
| 6,392,254 B1 | 5/2002 | Liu et al. |
| 6,399,166 B1 | 6/2002 | Khan et al. |
| 6,400,359 B1 | 6/2002 | Katabami |
| 6,441,362 B1 | 8/2002 | Ogawa |
| 6,453,008 B1 | 9/2002 | Sakaguchi et al. |
| 6,465,824 B1 | 10/2002 | Kwasnick et al. |
| 6,476,447 B1 | 11/2002 | Yamazaki et al. |
| 6,489,631 B2 | 12/2002 | Young et al. |
| 6,495,387 B2 | 12/2002 | French |
| 6,504,530 B1 | 1/2003 | Wilson et al. |
| 6,518,561 B1 | 2/2003 | Miura |
| 6,521,109 B1 | 2/2003 | Bartic et al. |
| 6,529,189 B1 | 3/2003 | Colgan et al. |
| 6,552,745 B1 | 4/2003 | Perner |
| 6,597,348 B1 | 7/2003 | Yamazaki et al. |
| 6,603,867 B1 | 8/2003 | Sugino et al. |
| 6,646,636 B1 | 11/2003 | Popovich et al. |
| 6,667,740 B2 | 12/2003 | Ely et al. |
| 6,679,702 B1 | 1/2004 | Rau |
| 6,681,034 B1 | 1/2004 | Russo |
| 6,690,387 B2 | 2/2004 | Zimmerman et al. |
| 6,738,031 B2 | 5/2004 | Young et al. |
| 6,738,050 B2 | 5/2004 | Comiskey et al. |
| 6,741,655 B1 | 5/2004 | Chang et al. |
| 6,762,741 B2 | 7/2004 | Weindorf |
| 6,762,752 B2 | 7/2004 | Perski et al. |
| 6,803,906 B1 | 10/2004 | Morrison et al. |
| 6,815,716 B2 | 11/2004 | Sanson et al. |
| 6,831,710 B2 | 12/2004 | den Boer |
| 6,862,022 B2 | 3/2005 | Slupe |
| 6,862,037 B2 | 3/2005 | Lin |
| 6,864,882 B2 | 3/2005 | Newton |
| 6,879,344 B1 | 4/2005 | Nakamura et al. |
| 6,879,710 B1 | 4/2005 | Hinoue et al. |
| 6,888,528 B2 | 5/2005 | Rai et al. |
| 6,947,017 B1 | 9/2005 | Gettemy |
| 6,947,102 B2 | 9/2005 | den Boer et al. |
| 6,972,753 B1 | 12/2005 | Kimura et al. |
| 6,995,743 B2 | 2/2006 | Boer et al. |
| 7,006,080 B2 | 2/2006 | Gettemy |
| 7,009,663 B2 | 3/2006 | Abileah et al. |
| 7,015,894 B2 | 3/2006 | Morohoshi |
| 7,023,503 B2 | 4/2006 | den Boer |
| 7,053,967 B2 | 5/2006 | Abileah et al. |
| 7,068,254 B2 | 6/2006 | Yamazaki et al. |
| 7,098,894 B2 | 8/2006 | Yang et al. |
| 7,109,465 B2 | 9/2006 | Kok et al. |
| 7,157,649 B2 | 1/2007 | Hill |
| 7,161,578 B1 | 1/2007 | Schneider |
| 7,164,164 B2 | 1/2007 | Nakamura et al. |
| 7,176,905 B2 | 2/2007 | Baharav et al. |
| 7,177,026 B2 | 2/2007 | Perlin |
| 7,184,009 B2 | 2/2007 | Bergquist |
| 7,184,064 B2 | 2/2007 | Zimmerman et al. |
| 7,190,461 B2 | 3/2007 | Han et al. |
| 7,193,618 B2 | 3/2007 | Morehouse |
| 7,205,988 B2 | 4/2007 | Nakamura et al. |
| 7,208,102 B2 | 4/2007 | Aoki et al. |
| 7,242,049 B2 | 7/2007 | Forbes et al. |
| 7,250,596 B2 | 7/2007 | Reime |
| 7,262,764 B2 | 8/2007 | Wang et al. |
| 7,298,367 B2 | 11/2007 | Geaghan et al. |
| 7,348,946 B2 | 3/2008 | Booth, Jr. et al. |
| 7,372,455 B2 | 5/2008 | Perski et al. |
| 7,408,598 B2 | 8/2008 | den Boer et al. |
| 7,418,117 B2 | 8/2008 | Kim et al. |
| 7,450,105 B2 | 11/2008 | Nakamura et al. |
| 7,456,812 B2 | 11/2008 | Smith et al. |
| 7,463,297 B2 | 12/2008 | Yoshida et al. |
| 7,474,809 B2 | 1/2009 | Carl et al. |
| 7,483,005 B2 | 1/2009 | Nakamura et al. |
| 7,522,149 B2 | 4/2009 | Nakamura et al. |
| 7,535,468 B2 | 5/2009 | Uy |
| 7,536,557 B2 | 5/2009 | Murakami et al. |
| 7,545,371 B2 | 6/2009 | Nakamura et al. |
| 7,598,949 B2 | 10/2009 | Han |
| 7,609,862 B2 | 10/2009 | Black |
| 7,612,767 B1 | 11/2009 | Griffin et al. |
| 7,629,945 B2 | 12/2009 | Baudisch |
| 7,649,527 B2 | 1/2010 | Cho et al. |
| 7,663,607 B2 | 2/2010 | Hotelling et al. |
| 7,676,945 B2 | 3/2010 | Prestidge et al. |
| 7,719,515 B2 * | 5/2010 | Fujiwara et al. ............... 345/156 |
| 7,786,978 B2 | 8/2010 | Lapstun et al. |
| 7,859,519 B2 | 12/2010 | Tulbert |
| 7,924,272 B2 | 4/2011 | Boer et al. |
| 7,961,909 B2 | 6/2011 | Mandella et al. |
| 8,094,128 B2 | 1/2012 | Vu et al. |
| 8,159,474 B2 * | 4/2012 | Hauck ........................... 345/179 |
| 8,169,421 B2 | 5/2012 | Wright et al. |
| 8,479,122 B2 | 7/2013 | Hotelling et al. |
| 8,638,320 B2 | 1/2014 | Harley |
| 2001/0000676 A1 | 5/2001 | Zhang et al. |
| 2001/0003711 A1 | 6/2001 | Coyer |
| 2001/0025289 A1 | 9/2001 | Jenkins et al. |
| 2001/0044858 A1 | 11/2001 | Rekimoto et al. |
| 2001/0046013 A1 | 11/2001 | Noritake et al. |
| 2001/0052597 A1 | 12/2001 | Young et al. |
| 2001/0055008 A1 | 12/2001 | Young et al. |
| 2002/0027164 A1 | 3/2002 | Mault et al. |
| 2002/0030581 A1 | 3/2002 | Janiak et al. |
| 2002/0030768 A1 | 3/2002 | Wu |
| 2002/0052192 A1 | 5/2002 | Yamazaki et al. |
| 2002/0063518 A1 | 5/2002 | Okamoto et al. |
| 2002/0067845 A1 | 6/2002 | Griffis |
| 2002/0071074 A1 | 6/2002 | Noritake et al. |
| 2002/0074549 A1 | 6/2002 | Park et al. |
| 2002/0080123 A1 | 6/2002 | Kennedy et al. |
| 2002/0080263 A1 | 6/2002 | Krymski |
| 2002/0126240 A1 | 9/2002 | Seiki et al. |
| 2002/0148655 A1 | 10/2002 | Cho et al. |
| 2002/0149571 A1 | 10/2002 | Roberts |
| 2002/0175903 A1 | 11/2002 | Fahraeus et al. |

(56) References Cited

U.S. PATENT DOCUMENTS

| | | |
|---|---|---|
| 2003/0038778 A1 | 2/2003 | Noguera |
| 2003/0103030 A1 | 6/2003 | Wu |
| 2003/0117369 A1 | 6/2003 | Spitzer et al. |
| 2003/0137494 A1 | 7/2003 | Tulbert |
| 2003/0151569 A1 | 8/2003 | Lee et al. |
| 2003/0156087 A1 | 8/2003 | Boer et al. |
| 2003/0156100 A1 | 8/2003 | Gettemy |
| 2003/0156230 A1 | 8/2003 | Boer et al. |
| 2003/0174256 A1 | 9/2003 | Kim et al. |
| 2003/0174870 A1 | 9/2003 | Kim et al. |
| 2003/0179323 A1 | 9/2003 | Abileah et al. |
| 2003/0183019 A1 | 10/2003 | Chae |
| 2003/0197691 A1 | 10/2003 | Fujiwara et al. |
| 2003/0205662 A1 | 11/2003 | Boer et al. |
| 2003/0218116 A1 | 11/2003 | Boer et al. |
| 2003/0231277 A1 | 12/2003 | Zhang |
| 2003/0234759 A1 | 12/2003 | Bergquist |
| 2004/0008189 A1 | 1/2004 | Clapper et al. |
| 2004/0046900 A1 | 3/2004 | Boer et al. |
| 2004/0095333 A1 | 5/2004 | Morag et al. |
| 2004/0113877 A1 | 6/2004 | Abileah et al. |
| 2004/0125430 A1 | 7/2004 | Kasajima et al. |
| 2004/0140962 A1 | 7/2004 | Wang et al. |
| 2004/0155871 A1 | 8/2004 | Perski et al. |
| 2004/0189587 A1 | 9/2004 | Jung et al. |
| 2004/0191976 A1 | 9/2004 | Udupa et al. |
| 2004/0252867 A1 | 12/2004 | Lan et al. |
| 2005/0040393 A1 | 2/2005 | Hong |
| 2005/0091297 A1 | 4/2005 | Sato et al. |
| 2005/0110777 A1 | 5/2005 | Geaghan et al. |
| 2005/0117079 A1 | 6/2005 | Pak et al. |
| 2005/0134749 A1 | 6/2005 | Abileah |
| 2005/0146517 A1 | 7/2005 | Robrecht et al. |
| 2005/0162411 A1 | 7/2005 | Van Berkel |
| 2005/0173703 A1 | 8/2005 | Lebrun |
| 2005/0179706 A1 | 8/2005 | Childers |
| 2005/0200603 A1 | 9/2005 | Casebolt et al. |
| 2005/0206764 A1 | 9/2005 | Kobayashi et al. |
| 2005/0231656 A1 | 10/2005 | den Boer et al. |
| 2005/0270590 A1 | 12/2005 | Izumi et al. |
| 2005/0271458 A1 | 12/2005 | Kui |
| 2005/0280628 A1 | 12/2005 | Adams et al. |
| 2005/0285985 A1 | 12/2005 | Boer et al. |
| 2006/0007224 A1 | 1/2006 | Hayashi et al. |
| 2006/0007336 A1 | 1/2006 | Yamaguchi |
| 2006/0010658 A1 | 1/2006 | Bigley |
| 2006/0012580 A1 | 1/2006 | Perski et al. |
| 2006/0026521 A1 | 2/2006 | Hotelling et al. |
| 2006/0034492 A1 | 2/2006 | Siegel et al. |
| 2006/0120013 A1 | 6/2006 | Diorio et al. |
| 2006/0125971 A1 | 6/2006 | Abileah et al. |
| 2006/0146015 A1 | 7/2006 | Buchmann |
| 2006/0170658 A1 | 8/2006 | Nakamura et al. |
| 2006/0176288 A1 | 8/2006 | Pittel et al. |
| 2006/0187367 A1 | 8/2006 | Abileah et al. |
| 2006/0197753 A1 | 9/2006 | Hotelling |
| 2006/0202975 A1 | 9/2006 | Chiang |
| 2006/0227121 A1 | 10/2006 | Oliver |
| 2006/0242562 A1 | 10/2006 | Wang et al. |
| 2006/0249763 A1 | 11/2006 | Mochizuki et al. |
| 2006/0250381 A1 | 11/2006 | Geaghan |
| 2006/0279690 A1 | 12/2006 | Yu et al. |
| 2007/0008299 A1 | 1/2007 | Hristov |
| 2007/0030258 A1 | 2/2007 | Pittel et al. |
| 2007/0109239 A1 | 5/2007 | den Boer et al. |
| 2007/0109274 A1* | 5/2007 | Reynolds ............. 345/173 |
| 2007/0109286 A1 | 5/2007 | Nakamura et al. |
| 2007/0131991 A1 | 6/2007 | Sugawa |
| 2007/0216905 A1 | 9/2007 | Han et al. |
| 2007/0242056 A1 | 10/2007 | Engelhardt et al. |
| 2007/0279346 A1 | 12/2007 | den Boer et al. |
| 2007/0285405 A1 | 12/2007 | Rehm |
| 2008/0029691 A1 | 2/2008 | Han |
| 2008/0048995 A1 | 2/2008 | Abileah et al. |
| 2008/0049153 A1 | 2/2008 | Abileah et al. |
| 2008/0049154 A1 | 2/2008 | Abileah et al. |
| 2008/0055295 A1 | 3/2008 | den Boer et al. |
| 2008/0055496 A1 | 3/2008 | Abileah et al. |
| 2008/0055497 A1 | 3/2008 | Abileah et al. |
| 2008/0055498 A1 | 3/2008 | Abileah et al. |
| 2008/0055499 A1 | 3/2008 | den Boer et al. |
| 2008/0055507 A1 | 3/2008 | den Boer et al. |
| 2008/0062156 A1 | 3/2008 | Abileah et al. |
| 2008/0062157 A1 | 3/2008 | Abileah et al. |
| 2008/0062343 A1 | 3/2008 | Boer et al. |
| 2008/0066972 A1 | 3/2008 | Abileah et al. |
| 2008/0084374 A1 | 4/2008 | Abileah et al. |
| 2008/0111780 A1 | 5/2008 | Abileah et al. |
| 2008/0128180 A1 | 6/2008 | Perski et al. |
| 2008/0129909 A1 | 6/2008 | den Boer et al. |
| 2008/0129913 A1 | 6/2008 | den Boer et al. |
| 2008/0129914 A1 | 6/2008 | den Boer et al. |
| 2008/0156546 A1* | 7/2008 | Hauck ............. 178/19.01 |
| 2008/0158165 A1 | 7/2008 | Geaghan et al. |
| 2008/0158172 A1 | 7/2008 | Hotelling et al. |
| 2008/0165311 A1 | 7/2008 | Abileah et al. |
| 2008/0205762 A1 | 8/2008 | Lapstun et al. |
| 2008/0278443 A1 | 11/2008 | Schelling et al. |
| 2008/0284925 A1 | 11/2008 | Han |
| 2008/0297487 A1 | 12/2008 | Hotelling et al. |
| 2008/0297493 A1 | 12/2008 | Adkins |
| 2008/0309625 A1 | 12/2008 | Krah et al. |
| 2009/0065269 A1 | 3/2009 | Katsuhira |
| 2009/0115725 A1 | 5/2009 | Shemesh et al. |
| 2009/0128529 A1 | 5/2009 | Izumi et al. |
| 2009/0135492 A1 | 5/2009 | Kusuda et al. |
| 2009/0167702 A1 | 7/2009 | Nurmi |
| 2009/0167728 A1 | 7/2009 | Geaghan et al. |
| 2009/0225210 A1 | 9/2009 | Sugawa |
| 2009/0262637 A1 | 10/2009 | Badaye et al. |
| 2010/0001978 A1 | 1/2010 | Lynch et al. |
| 2010/0006350 A1 | 1/2010 | Elias |
| 2010/0013793 A1 | 1/2010 | Abileah et al. |
| 2010/0013794 A1 | 1/2010 | Abileah et al. |
| 2010/0013796 A1 | 1/2010 | Abileah et al. |
| 2010/0020037 A1 | 1/2010 | Narita et al. |
| 2010/0020044 A1 | 1/2010 | Abileah et al. |
| 2010/0033766 A1 | 2/2010 | Marggraff |
| 2010/0045904 A1 | 2/2010 | Katoh et al. |
| 2010/0051356 A1* | 3/2010 | Stern et al. ............. 178/19.04 |
| 2010/0053113 A1 | 3/2010 | Wu |
| 2010/0059296 A9 | 3/2010 | Abileah et al. |
| 2010/0060590 A1* | 3/2010 | Wilson et al. ............. 345/173 |
| 2010/0066693 A1 | 3/2010 | Sato et al. |
| 2010/0073323 A1 | 3/2010 | Geaghan |
| 2010/0085325 A1* | 4/2010 | King-Smith et al. ......... 345/174 |
| 2010/0085471 A1 | 4/2010 | Craven-Bartle |
| 2010/0118237 A1 | 5/2010 | Katoh et al. |
| 2010/0160041 A1 | 6/2010 | Grant et al. |
| 2010/0213252 A1 | 8/2010 | Lapstun et al. |
| 2010/0252335 A1 | 10/2010 | Orsley |
| 2010/0271332 A1 | 10/2010 | Wu et al. |
| 2010/0289754 A1 | 11/2010 | Sleeman et al. |
| 2010/0302419 A1 | 12/2010 | den Boer et al. |
| 2010/0315384 A1* | 12/2010 | Hargreaves et al. ......... 345/179 |
| 2010/0315394 A1 | 12/2010 | Katoh et al. |
| 2010/0330912 A1 | 12/2010 | Saila |
| 2011/0001708 A1 | 1/2011 | Sleeman |
| 2011/0043489 A1 | 2/2011 | Yoshimoto |
| 2011/0122087 A1 | 5/2011 | Jan et al. |
| 2011/0169771 A1 | 7/2011 | Fujioka et al. |
| 2011/0175834 A1 | 7/2011 | Han et al. |
| 2011/0273376 A1 | 11/2011 | Dickinson et al. |
| 2011/0304592 A1 | 12/2011 | Booth et al. |
| 2012/0019488 A1 | 1/2012 | McCarthy |
| 2012/0050207 A1 | 3/2012 | Westhues et al. |
| 2012/0062497 A1 | 3/2012 | Rebeschi et al. |
| 2012/0068964 A1 | 3/2012 | Wright et al. |
| 2012/0105362 A1* | 5/2012 | Kremin et al. ............. 345/174 |
| 2012/0146958 A1* | 6/2012 | Oda et al. ............. 345/179 |
| 2012/0154340 A1* | 6/2012 | Vuppu et al. ............. 345/179 |
| 2012/0327040 A1 | 12/2012 | Simon |
| 2012/0327041 A1 | 12/2012 | Harley |
| 2012/0327042 A1 | 12/2012 | Harley |

(56) References Cited

U.S. PATENT DOCUMENTS

| | | |
|---|---|---|
| 2012/0331546 A1 | 12/2012 | Falkenburg |
| 2013/0106717 A1 | 5/2013 | Sundara-Rajan et al. |
| 2013/0201162 A1 | 8/2013 | Cavilia |
| 2014/0028635 A1 | 1/2014 | Krah |

FOREIGN PATENT DOCUMENTS

| | | |
|---|---|---|
| DE | 199 22 777 A1 | 11/2000 |
| EP | 0 306 596 A2 | 3/1989 |
| EP | 0 366 913 B1 | 5/1990 |
| EP | 0 384 509 B1 | 8/1990 |
| EP | 0 426 362 A2 | 5/1991 |
| EP | 0 426 469 A2 | 5/1991 |
| EP | 0 464 908 B1 | 1/1992 |
| EP | 0 488 455 B1 | 6/1992 |
| EP | 0 490 683 B1 | 6/1992 |
| EP | 0 491 436 B1 | 6/1992 |
| EP | 0 509 589 B1 | 10/1992 |
| EP | 0 545 709 B1 | 6/1993 |
| EP | 0 572 009 A1 | 12/1993 |
| EP | 0 572 182 B1 | 12/1993 |
| EP | 0 587 236 B1 | 3/1994 |
| EP | 0 601 837 B1 | 6/1994 |
| EP | 0 618 527 B1 | 10/1994 |
| EP | 0 633 542 B1 | 1/1995 |
| EP | 0 762 319 A2 | 3/1997 |
| EP | 0 762 319 A3 | 3/1997 |
| EP | 0 770 971 A2 | 5/1997 |
| EP | 0 962 881 A2 | 12/1999 |
| EP | 1 022 675 A2 | 7/2000 |
| EP | 1 128 170 A1 | 8/2001 |
| EP | 2 221 659 A1 | 8/2010 |
| EP | 2 385 684 A1 | 11/2011 |
| EP | 2 466 431 A1 | 6/2012 |
| JP | 55-074635 A | 6/1980 |
| JP | 57-203129 A | 12/1982 |
| JP | 60-179823 A | 9/1985 |
| JP | 64-006927 U | 1/1989 |
| JP | 64-040004 U | 2/1989 |
| JP | 1-196620 A | 8/1989 |
| JP | 2-182581 A | 7/1990 |
| JP | 2-211421 A | 8/1990 |
| JP | 5-019233 A | 1/1993 |
| JP | 5-173707 A | 7/1993 |
| JP | 8-166849 A | 6/1996 |
| JP | 9-001279 A | 1/1997 |
| JP | 9-185457 A | 7/1997 |
| JP | 9-231002 A | 9/1997 |
| JP | 9-274537 A | 10/1997 |
| JP | 10-027068 A | 1/1998 |
| JP | 10-040004 A | 2/1998 |
| JP | 10-133817 A | 5/1998 |
| JP | 10-133819 A | 5/1998 |
| JP | 10-186136 A | 7/1998 |
| JP | 10-198515 A | 7/1998 |
| JP | 11-110110 A | 4/1999 |
| JP | 11-242562 A | 9/1999 |
| JP | 2000-020241 A | 1/2000 |
| JP | 2000-163031 A | 6/2000 |
| JP | 2002-342033 A | 11/2002 |
| JP | 2005-129948 A | 5/2005 |
| WO | WO-97/40488 A1 | 10/1997 |
| WO | WO-99/21160 A1 | 4/1999 |
| WO | WO-99/22338 A1 | 5/1999 |
| WO | WO-01/45283 A1 | 6/2001 |
| WO | WO-2006/104214 A1 | 10/2006 |
| WO | WO-2007/145346 A1 | 12/2007 |
| WO | WO-2007/145347 A1 | 12/2007 |
| WO | WO-2008/018201 A1 | 2/2008 |
| WO | WO-2008/044368 A1 | 4/2008 |
| WO | WO-2008/044369 A1 | 4/2008 |
| WO | WO-2008/044370 A1 | 4/2008 |
| WO | WO-2008/044371 A1 | 4/2008 |
| WO | WO-2008/047677 A1 | 4/2008 |
| WO | WO-2009/081810 A1 | 7/2009 |
| WO | WO-2012/177567 A1 | 12/2012 |
| WO | WO-2012/177569 A2 | 12/2012 |
| WO | WO-2012/177571 A1 | 12/2012 |
| WO | WO-2012/177573 A2 | 12/2012 |
| WO | WO-2012/177569 A3 | 3/2013 |
| WO | WO-2014/018184 A1 | 1/2014 |
| WO | WO-2014/018185 A2 | 1/2014 |

OTHER PUBLICATIONS

"Introducing the Pogo Stylus for use with iPhone and iPod Touch"; Apr. 8, 2008, Website URL= http://www.tenonedesign.com/stylus.php (6 pages).

"Painting with iPod Touch", Oct. 23, 2007, Website URL=http://www.youtube.com/watch?v=hwDzFzrMZSg (1 page).

Abileah, A. et al. (2004). "59.3: Integrated Optical Touch Panel in a 14.1' AMLCD," *SID '04 Digest* (Seattle) pp. 1544-1547.

Abileah, A. et al. (2006). "9.3: Optical Sensors Embedded within AMLCD Panel: Design and Applications," *ADEAC '06, SID* (Atlanta) pp. 102-105.

Abileah, A. et al. (2007). "Optical Sensors Embedded within AMLCD Panel: Design and Applications," *Siggraph-07*, San Diego, 5 pages.

Bobrov, Y. et al. (2002). "5.2 Manufacturing of a Thin-Film LCD," *Optiva, Inc.*, San Francisco, CA. 4 pages.

Brown, C. et al. (2007). "7.2: A 2.6 inch VGA LCD with Optical Input Function using a 1-Transistor Active-Pixel Sensor," *ISSCC 2007* pp. 132-133, 592.

Den Boer, W. et al. (2003). "56.3: Active Matrix LCD with Integrated Optical Touch Screen," *SID '03 Digest* (Baltimore) pp. 1-4.

Dion, Stephane, "Accessories: iPhone Stylus? Do You Really Need it?"; Apr. 8, 2008, Website URL= http://www.iphonefreak.com/2007/10/accessories-iph.html (4 pages).

Echtler, F. et al. (Jan. 2010). "An LED-based Multitouch Sensor for LCD Screens," Cambridge, MA *ACM* 4 pages.

Final Office Action mailed Mar. 4, 2004, for U.S. Appl. No. 10/217,798, filed Aug. 12, 2002, 17 pages.

Final Office Action mailed Jan. 21, 2005, for U.S. Appl. No. 10/329,217, filed Dec. 23, 2002, 13 pages.

Final Office Action mailed Aug. 9, 2005, for U.S. Appl. No. 10/442,433, filed May 20, 2003, 13 pages.

Final Office Action mailed Aug. 23, 2005, for U.S. Appl. No. 10/217,798, filed Aug. 12, 2002, 10 pages.

Final Office Action mailed Dec. 13, 2005, for U.S. Appl. No. 10/371,413, filed Feb. 20, 2003, seven pages.

Final Office Action mailed May 23, 2007, for U.S. Appl. No. 11/137,753, filed May 25, 2005, 12 pages.

Final Office Action mailed Oct. 18, 2007, for U.S. Appl. No. 11/351,098, filed Feb. 8, 2006, six pages.

Final Office Action mailed Oct. 31, 2007, for U.S. Appl. No. 10/217,798, filed Aug. 12, 2002, 10 pages.

Final Office Action mailed Mar. 24, 2009, for U.S. Appl. No. 11/351,098, filed Feb. 8, 2006, 11 pages.

Final Office Action mailed Feb. 10, 2011, for U.S. Appl. No. 11/901,649, filed Sep. 18, 2007, 20 pages.

Final Office Action mailed May 18, 2011, for U.S. Appl. No. 11/978,031, filed Oct. 25, 2007, 17 pages.

Final Office Action mailed Jun. 15, 2011, for U.S. Appl. No. 11/595,071, filed Nov. 8, 2006, 9 pages.

Final Office Action mailed Jun. 24, 2011, for U.S. Appl. No. 11/978,006, filed Oct. 25, 2007, 12 pages.

Final Office Action mailed Jul. 5, 2011, for U.S. Appl. No. 11/977,279, filed Oct. 24, 2007, 12 pages.

Final Office Action mailed Sep. 29, 2011, for U.S. Appl. No. 11/977,911, filed Oct. 26, 2007, 22 pages.

Final Office Action mailed May 22, 2012, for U.S. Appl. No. 12/172,052, filed Jul. 11, 2008, 14 pages.

Final Office Action mailed Oct. 11, 2012, for U.S. Appl. No. 12/566,455, filed Sep. 24, 2009, eight pages.

Final Office Action mailed Oct. 25, 2012, for U.S. Appl. No. 12/568,302, filed Spetember 28, 2009, 14 pages.

(56) References Cited

OTHER PUBLICATIONS

Final Office Action mailed Oct. 25, 2012, for U.S. Appl. No. 12/568,316, filed Sep. 28, 2009, 16 pages.
Final Office Action mailed Jul. 26, 2013, for U.S. Appl. No. 13/166,726, filed Jun. 22, 2011, 10 pages.
Hong, S.J. et al. (2005). "Smart LCD Using a-Si Photo Sensor," *IMID '05 Digest* pp. 280-283.
International Preliminary Report on Patentability and Written Opinion mailed Oct. 8, 2004, for PCT Application No. PCT/US03/05300, filed Feb. 20, 2003, 15 pages.
International Preliminary Report on Patentability and Written Opinion mailed Dec. 30, 2004, for PCT Application No. PCT/US02/25573, filed Aug. 12, 2002, 16 pages.
International Preliminary Report on Patentability and Written Opinion mailed May 14, 2008, for PCT Application No. PCT/US06/43741, filed Nov. 10, 2006, four pages.
International Search Report mailed Apr. 14, 2003, for PCT Application No. PCT/US02/25573, filed Aug. 12, 2002, two pages.
International Search Report mailed Jun. 16, 2003, for PCT Application No. PCT/US03/05300, filed Feb. 20, 2003, two pages.
International Search Report mailed Nov. 11, 2003, for PCT Application No. PCT/US03/03277, filed Feb. 4, 2003, three pages.
International Search Report mailed Sep. 21, 2007, for PCT Application No. PCT/US06/43741, filed Nov. 10, 2006, one page.
International Search Report mailed Oct. 17, 2012, for PCT Application No. PCT/US2012/043019, filed Jun. 18, 2012, five pages.
International Search Report mailed Oct. 17, 2012, for PCT Application No. PCT/US2012/043023, filed Jun. 18, 2012, six pages.
International Search Report mailed Jan. 16, 2013, for PCT Application No. PCT/US2012/043021, filed Jun. 18, 2012, six pages.
International Search Report mailed Feb. 18, 2013, for PCT Application No. PCT/US2012/043025, filed Jun. 18, 2012, six pages.
International Search Report mailed Oct. 9, 2013, for PCT Application No. PCT/US02013/046017, filed Jun. 14, 2013, four pages.
Kim, J.H. et al. (May 14, 2000). "24.1: Fingerprint Scanner Using a-Si: H TFT-Array," *SID '00 Digest* pp. 353-355.
Kis, A. (2006). "Tactile Sensing and Analogic Algorithms," Ph.D. Dissertation, Péter Pázmány Catholic University, Budapest, Hungary 122 pages.
Non-Final Office Action mailed Jun. 4, 2003, for U.S. Appl. No. 10/217,798, filed Aug. 12, 2002, 17 pages.
Non-Final Office Action mailed May 21, 2004, for U.S. Appl. No. 10/329,217, filed Dec. 23, 2002, 14 pages.
Non-Final Office Action mailed Sep. 21, 2004, for U.S. Appl. No. 10/442,433, filed May 20, 2003, seven pages.
Non-Final Office Action mailed Nov. 26, 2004, for U.S. Appl. No. 10/307,106, filed Nov. 27, 2002, nine pages.
Non-Final Office Action mailed Dec. 10, 2004, for U.S. Appl. No. 10/217,798, filed Aug. 12, 2002, 10 pages.
Non-Final Office Action mailed Jan. 21, 2005, for U.S. Appl. No. 10/347,149, filed Jan. 17, 2003, 10 pages.
Non-Final Office Action mailed Apr. 15, 2005, for U.S. Appl. No. 10/371,413, Filed Feb. 20, 2003, five pages.
Non-Final Office Action mailed Jun. 22, 2005, for U.S. Appl. No. 10/739,455, filed Dec. 17, 2003, 11 pages.
Non-Final Office Action mailed Jul. 12, 2005, for U.S. Appl. No. 10/347,149, filed Jan. 17, 2003, four pages.
Non-Final Office Action mailed Jan. 13, 2006, for U.S. Appl. No. 10/217,798, filed Aug. 12, 2002, nine pages.
Non-Final Office Action mailed May 12, 2006, for U.S. Appl. No. 10/217,798, filed Aug. 12, 2002, eight pages.
Non-Final Office Action mailed Aug. 28, 2006, for U.S. Appl. No. 10/371,413, filed Feb. 20, 2003, seven pages.
Non-Final Office Action mailed Jun. 28, 2007, for U.S. Appl. No. 11/351,098, filed Feb. 8, 2006, 13 pages.
Non-Final Office Action mailed Jun. 29, 2007, for U.S. Appl. No. 10/217,798, filed Aug. 12, 2002, 11 pages.
Non-Final Office Action mailed Feb. 25, 2008, for U.S. Appl. No. 11/137,753, filed May 25, 2005, 16 pages.
Non-Final Office Action mailed Jun. 24, 2008, for U.S. Appl. No. 11/351,098, filed Feb. 8, 2006, 12 pages.
Non-Final Office Action mailed Jun. 25, 2009, for U.S. Appl. No. 11/980,029, filed Oct. 29, 2007, 10 pages.
Non-Final Office Action mailed Nov. 23, 2009, for U.S. Appl. No. 11/407,545, filed Apr. 19, 2006, six pages.
Non-Final Office Action mailed Jul. 29, 2010, for U.S. Appl. No. 11/901,649, filed Sep. 18, 2007, 22 pages.
Non-Final Office Action mailed Oct. 13, 2010, for U.S. Appl. No. 11/978,006, filed Oct. 25, 2007, nine pages.
Non-Final Office Action mailed Oct. 14, 2010, for U.S. Appl. No. 11/595,071, filed Nov. 8, 2006, eight pages.
Non-Final Office Action mailed Nov. 26, 2010, for U.S. Appl. No. 11/977,279, filed Oct. 24, 2007, 10 pages.
Non-Final Office Action mailed Nov. 26, 2010, for U.S. Appl. No. 11/977,830, filed Oct. 26, 2007, eight pages.
Non-Final Office Action mailed Dec. 13, 2010, for U.S. Appl. No. 11/977,339, filed Oct. 24, 2007, nine pages.
Non-Final Office Action mailed Feb. 1, 2011, for U.S. Appl. No. 11/978,031, filed Oct. 25, 2007, 20 pages.
Non-Final Office Action mailed Apr. 29, 2011, for U.S. Appl. No. 11/977,911, filed Oct. 26, 2007, 20 pages.
Non-Final Office Action mailed Jun. 21, 2011, for U.S. Appl. No. 11/977,339, filed Oct. 24, 2007, 11 pages.
Non-Final Office Action mailed Jun. 28, 2011, for U.S. Appl. No. 12/852,883, filed Aug. 8, 2010, 16 pages.
Non-Final Office Action mailed Nov. 2, 2011, for U.S. Appl. No. 12/568,316, filed Sep. 28, 2009, 31 pages.
Non-Final Office Action mailed Nov. 4, 2011, for U.S. Appl. No. 12/568,302, filed Sep. 28, 2009, 29 pages.
Non-Final Office Action mailed Nov. 17, 2011, for U.S. Appl. No. 11/977,339, filed Oct. 24, 2007, six pages.
Non-Final Office Action mailed Jan. 10, 2012, for U.S. Appl. No. 11/977,864, filed Oct. 26, 2007, nine pages.
Non-Final Office Action mailed Jan. 31, 2012, for U.S. Appl. No. 12/566,477, filed Sep. 24, 2009, 11 pages.
Non-Final Office Action mailed Feb. 7, 2012, for U.S. Appl. No. 12/172,052, filed Jul. 11, 2008, 13 pages.
Non-Final Office Action mailed Feb. 29, 2012, for U.S. Appl. No. 11/978,031, filed Oct. 25, 2007, 20 pages.
Non-Final Office Action mailed Apr. 20, 2012, for U.S. Appl. No. 12/566,455, filed Sep. 24, 2009, eight pages.
Non-Final Office Action mailed Jun. 5, 2012, for U.S. Appl. No. 11/595,071, filed Nov. 8, 2006, 14 pages.
Non-Final Office Action mailed Jun. 19, 2012, for U.S. Appl. No. 11/977,864, filed Oct. 26, 2007, nine pages.
Non-Final Office Action mailed Nov. 15, 2012, for U.S. Appl. No. 12/566,477, filed Sep. 24, 2009, 12 pages.
Non-Final Office Action mailed Mar. 5, 2013, for U.S. Appl. No. 13/166,726, filed Jun. 22, 2011, 14 pages.
Non-Final Office Action mailed Mar. 14, 2013, for U.S. Appl. No. 13/166,743, filed Jun. 22, 2011, 17 pages.
Non-Final Office Action mailed Mar. 29, 2013, for U.S. Appl. No. 13/166,699, filed Jun. 22, 2011, 17 pages.
Non-Final Office Action mailed Jun. 17, 2013, for U.S. Appl. No. 13/166,711, filed Jun. 22, 2011, 8 pages.
Non-Final Office Action mailed Sep. 6, 2013, for U.S. Appl. No. 13/857,886, filed Apr. 5, 2013, 10 pages.
Notice of Allowance mailed Sep. 17, 2013, for U.S. Appl. No. 13/166,743, filed Jun. 22, 2011, six pages.
Notification of Reasons for Rejection mailed Dec. 19, 2011, for JP Patent Application No. 2008-540205, with English Translation, six pages.
Pye, A. (Mar. 2001). "Top Touch-Screen Options," located at http://www.web.archive.org/web/20010627162135.http://www.industrialtechnology.co.uk/2001/mar/touch.html, last visited Apr. 29, 2004, two pages.
Rossiter, J. et al. (2005). "A Novel Tactile Sensor Using a Matrix of LEDs Operating in Both Photoemitter and Photodetector Modes," *IEEE* pp. 994-997.
U.S. Appl. No. 60/359,263, filed Feb. 20, 2002, by den Boer et al.
U.S. Appl. No. 60/383,040, filed May 23, 2002, by Abileah et al.

(56) References Cited

OTHER PUBLICATIONS

U.S. Appl. No. 60/736,708, filed Nov. 14, 2005, by den Boer et al.

U.S. Appl. No. 60/821,325, filed Aug. 3, 2006, by Abileah et al.

Yamaguchi, M. et al. (Jan. 1993). "Two-Dimensional Contact-Type Image Sensor Using Amorphous Silicon Photo-Transistor," *Jpn. J. Appl. Phys.* 32(Part 1, No. 1B):458-461.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Sep. 8, 2014, for U.S. Appl. No. 13/857,886, filed Apr. 5, 2013, 18 pages.

Final Office Action mailed Dec. 4, 2014, for U.S. Appl. No. 13/560,960, filed Jul. 27, 2012, 15 pages.

Final Office Action mailed Feb. 26, 2014, for U.S. Appl. No. 13/857,886, filed Apr. 5, 2013, 13 pages.

International Search Report mailed Feb. 24, 2014, 2013, for PCT Application No. PCT/US02013/046021, filed Jun. 14, 2013, five pages.

Non-Final Office Action mailed Apr. 24, 2014, for U.S. Appl. No. 13/560,960, filed Jul. 27, 2012, 14 pages.

\* cited by examiner personal
device
1200 personal
device
1300

STYLUS DEVICE

FIELD

This relates generally to touch sensitive devices and, more specifically, to styluses for use with touch sensitive devices.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

As touch sensing technology continues to improve, touch sensitive devices are increasingly being used to compose and mark-up electronic documents. In particular, styluses have become popular input devices as they emulate the feel of traditional writing instruments. However, while touch sensing technology has greatly improved over the past few years, little has been done to improve the stylus itself. Most conventional styluses simply include a bulky tip made of a material capable of interacting with the touch sensitive device. As a result, conventional styluses lack the precision and control of traditional writing instruments.

SUMMARY

Styluses capable of receiving stimulation and force signals and generating stylus stimulation signals, and touch sensitive devices capable of receiving stylus stimulation signals are disclosed. In one example, a stylus can receive a stimulation signal from a touch sensor of a touch sensitive device and generate a stylus stimulation signal by changing an amplitude or frequency of the received stimulation signal. The stylus can transmit the stylus stimulation signal back into the touch sensor of the touch sensitive device. The touch sensor can generate a touch signal based on the device's own stimulation signals and the stylus stimulation signal. The touch sensitive device can process the touch signal to determine a location of the stylus on the touch sensor. The stylus can include a force sensor to detect an amount of force applied to a tip of the stylus. The stylus stimulation signal can be modulated based on the force detected by the force sensor.

In one example, a touch sensor of a touch sensitive device can generate a touch signal based on the device's own stimulation signals and the stylus stimulation signal. The touch sensitive device can process the touch signal to determine that a stylus has been detected, a location of the stylus on the touch sensor, and an amount of pressure applied by the stylus to the touch sensitive device. The determinations can be made based on properties of the touch signal caused by the stylus stimulation signal.

Processes for generating and processing stylus stimulation signals are also disclosed.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to styluses capable of receiving stimulation and force signals and generating stylus stimulation signals and touch sensitive devices capable of receiving stylus stimulation signals. In one example, a stylus can receive a stimulation signal from a touch sensor of a touch sensitive device and generate a stylus stimulation signal by changing an amplitude or frequency of the received stimulation signal. The stylus can transmit the stylus stimulation signal back into the touch sensor of the touch sensitive device. The touch sensor can generate a touch signal based on the device's own stimulation signals and the stylus stimulation signal. The touch sensitive device can process the touch signal to determine a location of the stylus on the touch sensor. The stylus can include a force sensor to detect an amount of force applied to a tip of the stylus. The stylus stimulation signal can be modulated based on the force detected by the force sensor. A touch sensor of a touch sensitive device can generate a touch signal based on the device's own stimulation signals and the stylus stimulation signal. The touch sensitive device can process the touch signal to determine that a stylus has been detected, a location of the stylus on the touch sensor, and an amount of pressure applied by the stylus to the touch sensitive device. The determinations can be made based on properties of the touch signal caused by the stylus stimulation signal. Processes for generating and processing stylus stimulation signals are also disclosed.

Figure 1:
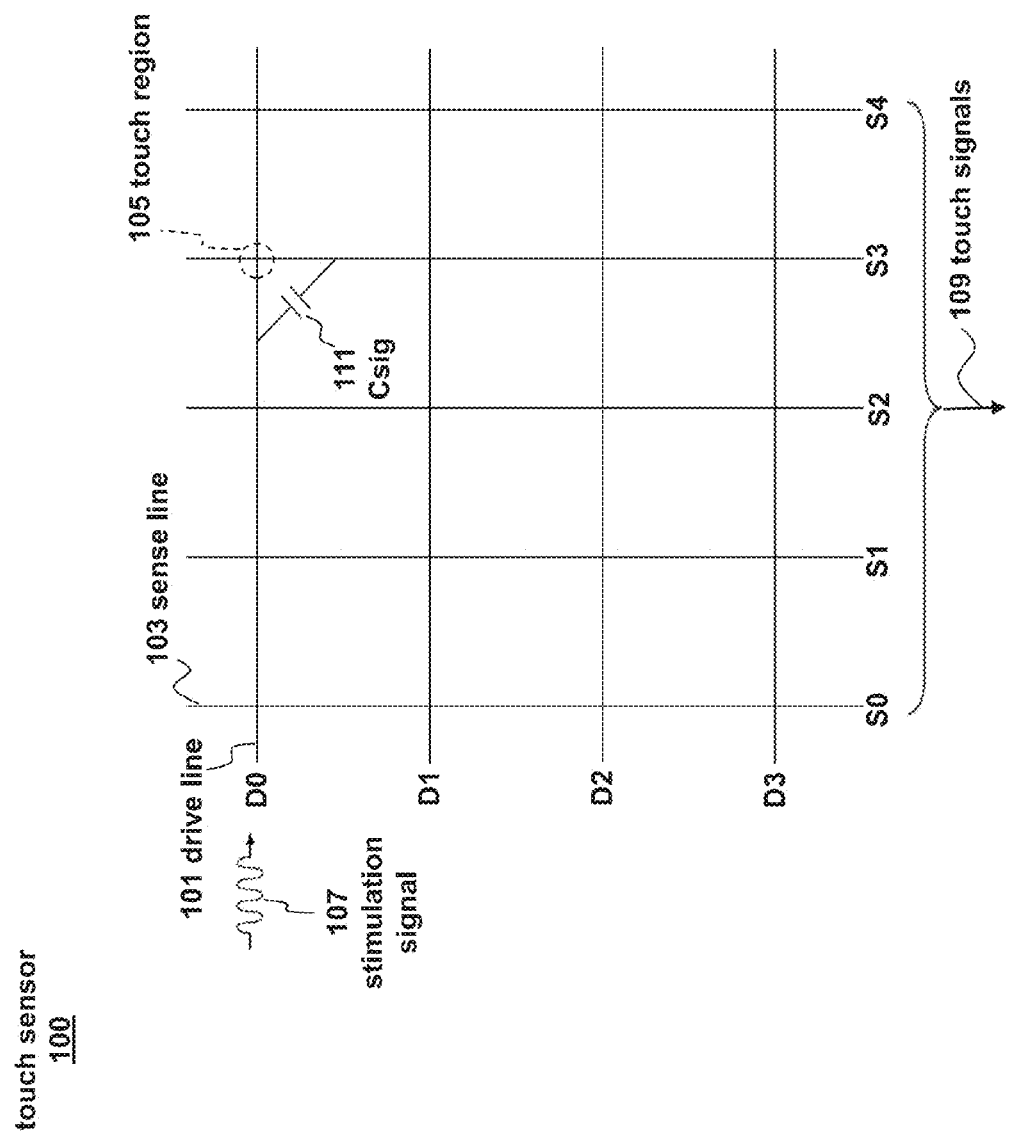
FIG. 1 illustrates an exemplary touch sensor that can be used with a touch sensitive device according to various embodiments.

FIG. 1 illustrates touch sensor 100 that can be used to detect touch events on a touch sensitive device, such as a mobile phone, tablet, touchpad, portable computer, portable media player, or the like. Touch sensor 100 can include an array of touch regions or nodes 105 that can be formed at the crossing points between rows of drive lines 101 (D0-D3) and columns of sense lines 103 (S0-S4). Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can transmit touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be transmitted by the sense lines 103 to the sense circuitry for processing. The touch signals 109 can indicate the touch region where the touch occurred and the amount of touch that occurred at that touch region location.

While the embodiment shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with embodiments of the disclosure, such as self-capacitance touch sensing, resistive touch sensing, projection scan touch sensing, and the like. Furthermore, while various embodiments describe a sensed touch, it should be appreciated that the touch sensor 100 can also sense a hovering object and generate hover signals therefrom.

Figure 2:
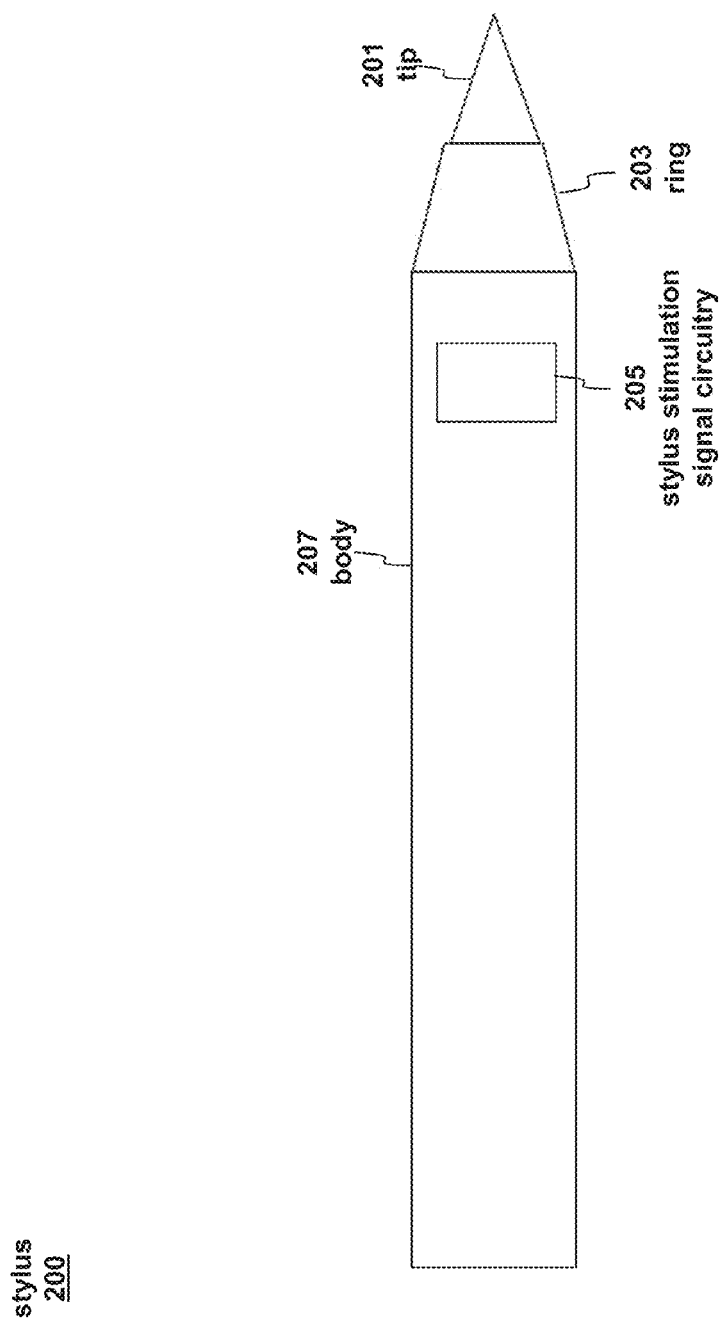
FIG. 2 illustrates a block diagram of an exemplary stylus according to various embodiments.

FIG. 2 illustrates a block diagram of an exemplary stylus 200 that can be used with a touch sensitive device, such as a mobile phone, touchpad, portable computer, or the like. Stylus 200 can generally include tip 201, ring 203, body 207, and stylus stimulation signal circuitry 205 located within body 207. As will be described in greater detail below, stylus stimulation signal circuitry 205 can be used to generate a stimulation signal that can be transmitted to a touch sensitive device through tip 201. Tip 201 can include a material capable of transmitting the stylus stimulation signal from stylus stimulation signal circuitry 205 to the touch sensitive device, such as a flexible conductor, a metal, a conductor wrapped by a non-conductor, a non-conductor coated with a metal, a transparent conducting material (e.g., indium tin oxide (ITO)) or a transparent non-conductive material (e.g., glass) coated with a transparent (e.g., ITO) (if the tip is also used for projection purposes) or opaque material, or the like. In some examples, tip 201 can have a diameter of 1 mm or less. Tip 201 can be coupled to body 207 by ring 203. Ring 203 can include a conductive material, such as a flexible conductor, a metal, a conductor wrapped by a non-conductor, a non-conductor coated with a metal, a transparent conducting material (e.g., ITO) or a transparent non-conductive material (e.g., glass) coated with a transparent (e.g., ITO if the tip is used for projection purposes) or opaque material, or the like. Ring 203 can serve other purposes, such as providing an alternative means for transmitting the stylus stimulation signal from the stylus to the touch sensitive device by serving as an antenna for a wireless module (e.g., RFID, Bluetooth, WI-FI, or the like). Similarly, tip 201 can also be used to sense the touch signal from the touch sensitive device. Both tip 201 and ring 203 can be segmented and each segment can be independently controlled according to the description above.

In some examples, stylus 200 can be a modular stylus, such as that described in U.S. patent application Ser. No. 13/560, 960, entitled "Modular Stylus Device".

Figure 3:
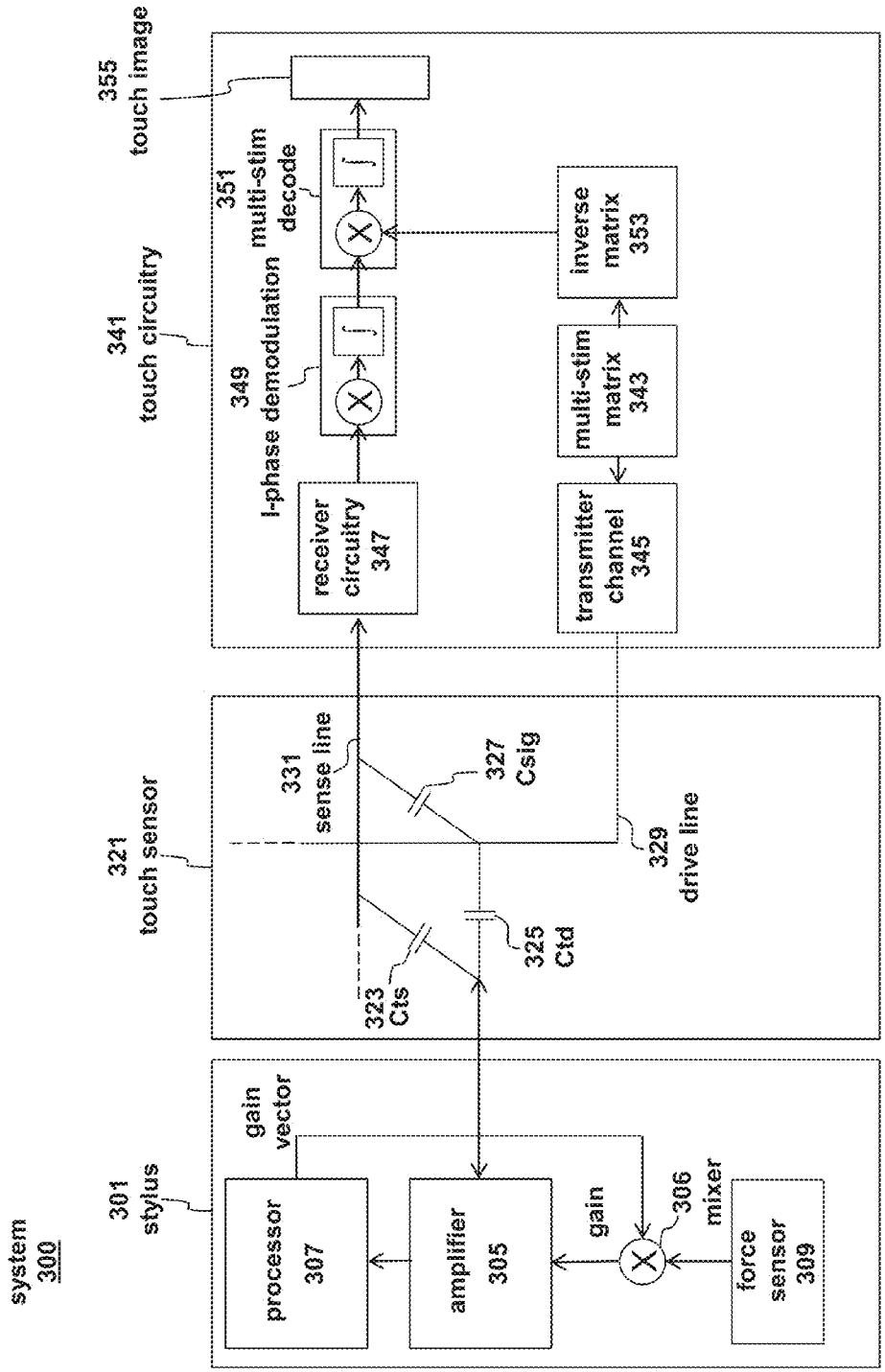
FIG. 3 illustrates a system block diagram showing the interaction between a touch sensitive device and an exemplary stylus according to various embodiments.

FIG. 3 illustrates a functional block diagram of an exemplary system 300 showing the interaction between stylus 301, touch sensor 321, and touch circuitry 341. In this embodiment, a stimulation signal from touch sensor 321 can be detected at a location where the tip of stylus 301 contacts or is near touch sensor 321 (e.g., where the tip contacts or hovers above a screen of a touch sensitive device). A modified stimulation signal can then be transmitted back into touch sensor 321 at the same frequency in phase or at an arbitrary phase (including quadrature) at the same location. The modified stimulation signal can be transmitted back into touch sensor 321 through the tip and/or ring of stylus 301. It should be appreciated that FIG. 3 is a functional block diagram and that the actual components used to implement the various portions of system 300 can vary and one of ordinary skill, given the functional diagram, can select known circuit elements to implement the system.

Stylus 301 is one example of stylus 200 that can be used as an input device to a touch sensitive device having a touch sensor similar or identical to touch sensor 100. Stylus 301 can be configured to generate a stylus stimulation signal having a greater magnitude than that generated by the touch sensitive device. Thus, when stylus 301 is used with a touch sensitive device, stylus 301 can cause the touch sensitive device to measure a "negative" touch. In other words, the charge detected at the stylus' touch location can be greater than the amount of charge detected when no touch is present. This is different than non-stylus touch events, which typically cause the charge detected at the touch location to decrease.

Stylus 301 can include amplifier 305 coupled to receive a stimulation signal (e.g., a stimulation signal similar or identical to stimulation signal 107) generated by an associated touch sensitive device and transmit a stylus stimulation signal to the associated touch sensitive device. The associated touch sensitive device can include a touch sensitive device in contact with, or in close proximity to, the tip of stylus 301. Stylus 301 can receive the stimulation signal through the touch sensor (e.g., touch sensor 321) of the touch sensitive device. Amplifier 305 can be configured to receive and amplify the stimulation signal by an amount based at least in part on a force detected by force sensor 309 and a gain vector generated by processor 307. In some examples, amplifier 305 can be configured to amplify the received stimulation signal by an amount representing an increase of capacitance by 0.1 pF or more, depending on the particular configuration. However, it should be appreciated that other amplifications can be used depending on the system design.

Stylus 301 can further include force sensor 309 to detect an amount of force applied to the tip of stylus 301. Force sensor 309 can include any type of force sensor, such as a capacitive pressure sensor, semiconductor strain gauge, or the like. The amount of force detected by force sensor 309 can be used by amplifier 305 to determine the amount of amplification to be applied to the stimulation signal received from the associated touch sensitive device. In this way, the magnitude of the amplified stimulation signal generated by amplifier 305 can be adjusted based on how hard the stylus tip is applied to the surface of the associated touch sensitive device. This allows stylus 301 to convey information associated with the location of its tip on the surface of the touch sensitive device as well as the amount of force being applied to the surface of the touch sensitive device. In response, the touch sensitive device can interpret the location and force information as two different inputs. For example, in a drawing application, a brush stroke can be displayed on the screen of the touch sensitive device corresponding to a location of the tip of stylus 301 and with a width corresponding to the amount of force being applied to the touch sensitive device by the tip of stylus 301.

Stylus 301 can further include processor 307 coupled to receive an amplified stimulation signal from amplifier 305. Processor 307 can be configured to generate a signal representative of a gain vector that can be used to modulate the amplified output of amplifier 305. The processor can monitor the stimulation signal received from the touch sensor 321 in order to synchronize the gain vector with the received stimulation sequence. The gain vector signal can be transmitted to mixer 306 where it, along with the output of force sensor 309, can be used to control the amount of amplification applied to the stimulation signal from touch sensor 321. The amplified and modulated stimulation signal can be transmitted back into touch sensor 321 as the stylus stimulation signal.

Figure 14:
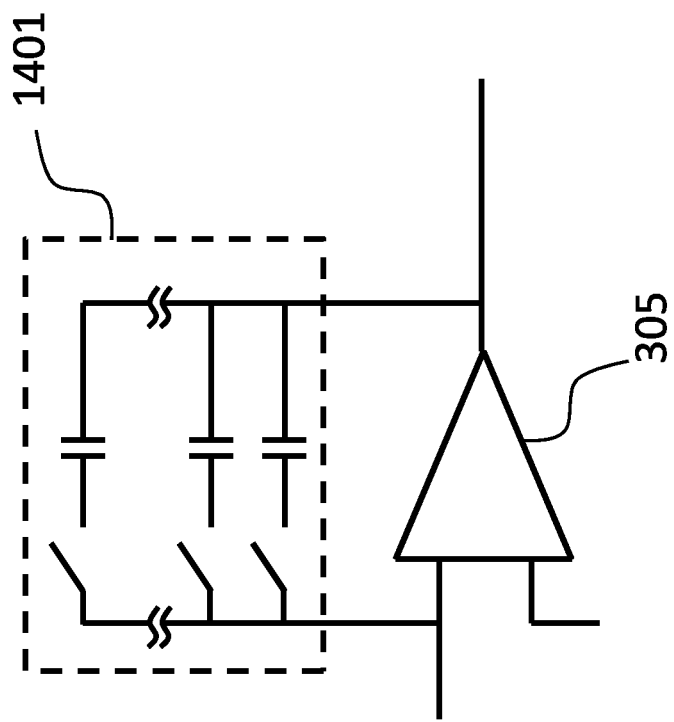
FIG. 14 illustrates a symbolic illustration of one or more capacitive elements coupled between the input and output of an amplifier according to various embodiments.

It should be appreciated that amplifier 305 can be configured to amplify the received stimulation signal based on the amount of force detected by force sensor 309 and the gain vector of processor 307 in many ways. In one example, amplifier 305 can include a regenerative amplifier operable to amplify the received stimulation signal using a feedback loop between the amplifier output and the amplifier input. FIG. 14 illustrates a symbolic illustration of one or more capacitive elements 1401 coupled between the input and output of an amplifier 305. The received stimulation signal can be added at the amplifier input in phase. The amplified stimulation signal can be transmitted to touch sensor 321, thereby increasing the signal charge locally between drive and sense (negative pixel) as opposed to reducing it in the presence of a touch. In this example, force sensor 309 can control one or more capacitive elements 1401 coupled between the input and output of amplifier 305. Switches can also be coupled to the capacitive elements to selectively couple the capacitive elements between the input and output of amplifier 305. The one or more capacitive elements 1401 can be configured such that the capacitance of each of the one or more capacitive elements is inversely related to the amount of force applied to the tip of stylus 301. Thus, as the force against the tip of stylus 300 increases, the capacitance of the one or more capacitive elements 1401 of force sensor 309 decreases, thereby increasing the overall gain of amplifier 305. Conversely, as the force against the tip of stylus 300 decreases, the capacitance of the one or more capacitive elements 1401 of force sensor 309 increases, thereby decreasing the overall gain of amplifier 305. In this example, processor 307 can be configured to cause amplifier 305 to modulate the stimulation signal using a gain vector by selectively coupling one of the one or more capacitive elements 1401 (each having a different capacitance value) between the input and output of amplifier 305 based on the gain vector. Processor 307 can accomplish this by selectively opening and closing the switches coupled to each capacitive element. In this way, the gain caused by each of the capacitive elements 1401 can be changed by adjusting the pressure applied to the tip of stylus 301 while processor 307 can modulate the amplified signal by selecting between each of the capacitive elements having different capacitance values.

In some examples, amplifier 305 can be configured to yield a loop gain of less than one to prevent oscillation. In other alternative examples, amplifier 305 can include a super regenerative amplifier, comprised of an amplifier with a loop gain of greater than 1 and a quench signal generator having a quench rate based on the received stimulation signal from touch sensor 321. In these examples, the quench signal generator can apply a quench signal that can cause the gain of the regenerative amplifier to drop substantially below the gain needed for the regenerative amplifier to sustain oscillation, causing the regenerative amplifier to repeatedly go into oscillation at the beginning of each scan step. In yet other examples, amplifier 305 can add the received stimulation signal at the amplifier input in a different phase (including quadrature).

System 300 can further include touch sensor 321 of a touch sensitive device. Touch sensor 321 can include a touch sensor similar or identical to touch sensor 100, described above. As shown in FIG. 3, touch sensor 321 can include a drive line 329 coupled to receive a stimulation signal similar or identical to stimulation signal 107 from touch circuitry 341 and a sense line 331 capacitively coupled to drive line 329 and coupled to transmit a touch signal similar or identical to touch signal 109 to touch circuitry 341. It should be appreciated that touch sensor 321 is shown with only one drive line and one sense line for illustrative purposes only and that touch sensor 321 can actually include any number of drive lines and any number of sense lines.

A mutual capacitance Csig 327 can be formed between the crossing drive line 329 and sense line 331 when the drive line is stimulated. Similarly, a mutual capacitance Cts 323 and Ctd 325 can be formed between the tip of stylus 301 and sense line 331 and drive line 329, respectively, when the stylus stimulation signal is generated. As mentioned above, if the tip of stylus 301 is placed near or at the crossing point between drive line 329 and sense line 331, stylus 301 can receive the stimulation signal transmitted on drive line 329 via the capacitive path formed between the stylus tip and drive line 329, amplify the received stimulation signal using amplifier 305, force sensor 309, and processor 307, and transmit an amplified stimulation signal in the form of a stylus stimulation signal back into touch sensor 321 via the capacitive path formed between the stylus tip and sense line 331. Thus, the touch signal generated by sense line 331 can include charges coupled from both drive line 329 and stylus 301. As a result, the amount of charge detected by sense line 331 can increase when the tip of stylus 301 is placed on or above the crossing point between drive line 329 and sense line 331. This increase in charge can be used by the touch sensitive device to distinguish a stylus touch event from a non-stylus touch event because, as mentioned above, non-stylus touch events typically cause capacitance Csig 327 to decrease due to charge or current from the stimulated drive line 329 being shunted through the non-stylus object to ground rather than being coupled to the crossing sense line 331 at the touch location. Moreover, the touch sensitive device can determine the location of the stylus touch event because the same stimulation signal being driven on drive line 329 is being amplified and transmitted back into the touch sensor at the crossing point between drive line 329 and sense line 331.

System 300 can further include touch circuitry 341 included in or associated with the touch sensitive device. Touch circuitry 341 can include multi-stim matrix 343 stored in a computer-readable storage medium. Multi-stim matrix 343 can include a matrix containing stimulation phase information for stimulation signals that can be simultaneously applied to the drive lines of touch sensor 321, such as that described in U.S. patent Ser. No. 12/208,329, entitled "Multiple Stimulation Phase Determination." Specifically, each row of the matrix can represent a single step among multiple steps needed to compute values for generating an image of touch, each column of the matrix can represent a drive line of touch sensor panel 321 to be stimulated, and each cell of the matrix can represent the phase of a stimulation signal to be applied to a particular drive line in a particular step. In one example, multi-stim matrix 343 can include an additional row and column to support the stylus stimulation signal from stylus 301. Specifically, the additional column can represent a drive line that is not driven, or a drive line that does not actually exist on touch sensor panel 321. The purpose of the additional column is to detect the stylus stimulation signal. Touch circuitry 341 can further include inverse multi-stim matrix 353 stored in a computer-readable storage medium. Inverse multi-stim matrix 353 can include a matrix representing an inverse of multi-stim matrix 343 for decoding a touch signal received from a sense line of touch sensor 321 to generate a touch image representing a touch detected by touch sensor 321. These matrices will be described in greater detail below with respect to FIGS. 4-7.

Referring back to FIG. 3, touch circuitry 341 can further include transmitter channel 345 coupled to transmit a stimulation signal to drive line 329 of touch sensor 321. Transmitter channel 345 can be configured to generate a stimulation signal similar or identical to stimulation signal 107 to be applied to drive line 329 based on the phase information contained in multi-stim matrix 343. In some examples, the stimulation signal can have a frequency between 80-120 KHz (e.g., 90, 100, or 110 KHz) and an amplitude between 3-5V (e.g., 4V). In other examples, the stimulation signal can have a frequency between 100 KHz to 1 MHz or higher (e.g., between 100-300 KHz or 100-500 KHz). Although not shown, touch circuitry 341 can include one transmitter channel for each drive line of touch sensor 321.

Touch circuitry 341 can further include receiver circuitry 347 coupled to receive a touch signal from sense line 331 of touch sensor 321. Receiver circuitry 347 can include amplifiers, filters, and/or analog to digital converters that one of ordinary skill in the art can select to appropriately process the touch signal received from sense line 331. Although not shown, touch circuitry 341 can include additional receiver circuitry for each sense line of touch sensor 321.

Touch circuitry 341 can further include in-phase (I-phase) demodulation circuitry 349 configured to demodulate the touch signal received from receiver circuitry 347. I-phase demodulation circuitry 347 can include a demodulation mixer and a demodulation integrator to extract the I-phase component of the touch signal output by sense line 331. Although not shown, touch circuitry 341 can include additional I-phase demodulation circuitry for each sense line of touch sensor 321. In some examples, transmitter channel 345, receiver circuitry 347, and I-phase demodulation circuitry 349 can include circuitry similar or identical to that described in U.S. patent application Ser. No. 11/818,345, which is incorporated by reference herein in its entirety as if put forth in full below.

Touch circuitry 341 can further include multi-stim decode circuitry 351 configured to decode the I-phase component of the touch signal received from I-phase demodulation circuitry 341. Multi-stim decode circuitry 351 can include a mixer coupled to multiply the I-phase component of the touch signal received from I-phase demodulation circuitry 341 with inverse multi-stim matrix 353. Multi-stim decode circuitry 351 can further include an integrator coupled to receive the output of the mixer and to output touch image 355 representing a touch detected by sense line 331 of touch sensor 321. Although not shown, touch circuitry 341 can include additional multi-stim decode circuitry for each sense line of touch sensor 3211.

Figure 4:
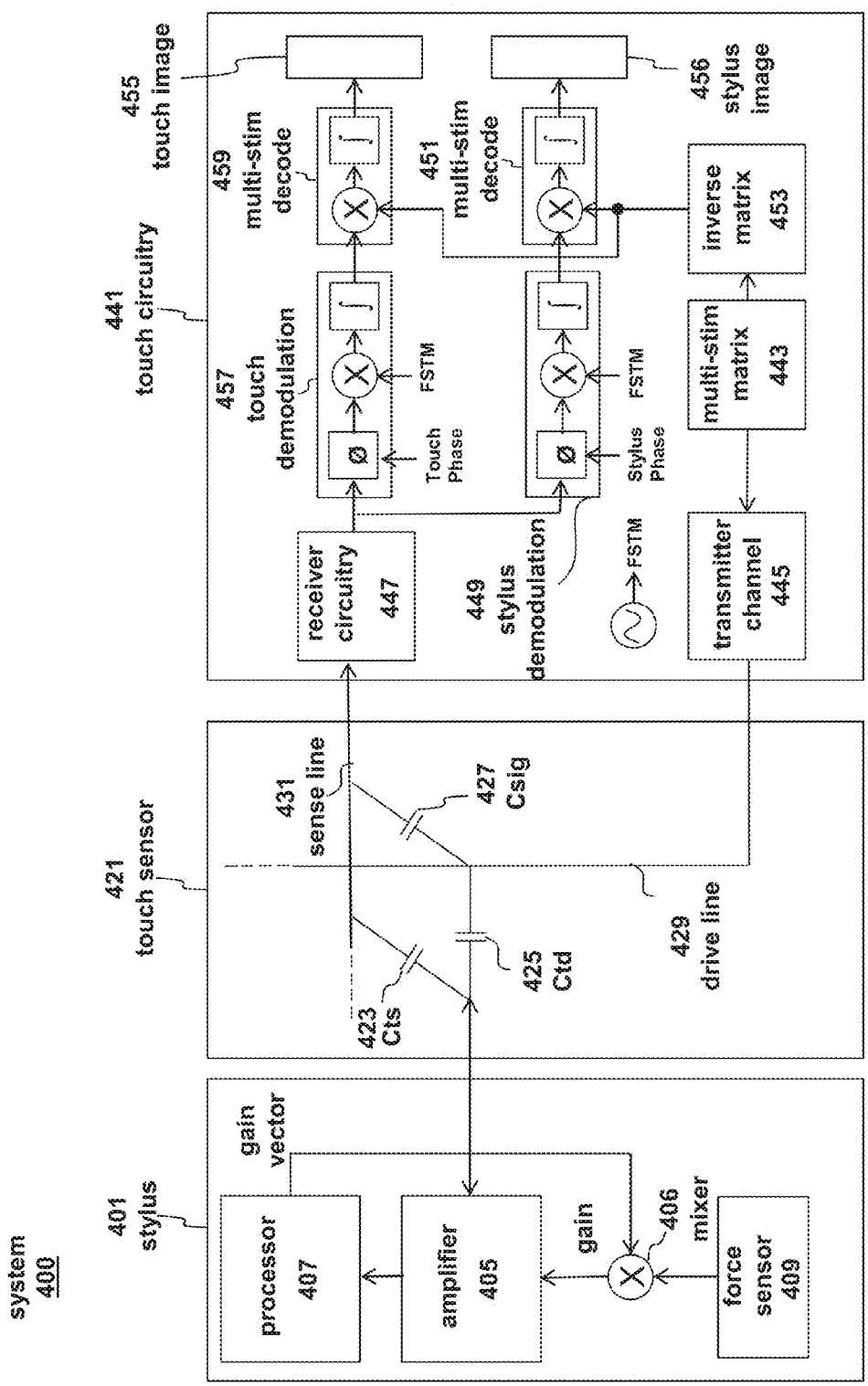
FIG. 4 illustrates a system block diagram showing the interaction between another touch sensitive device and an exemplary stylus according to various embodiments.

FIG. 4 illustrates a functional block diagram of another exemplary system 400 showing the interaction between stylus 401, touch sensor 421, and touch circuitry 441. In this embodiment, similar to that shown in FIG. 3, stylus 401 can receive a stimulation signal from touch sensor 421 at a location where the tip of stylus 401 contacts or is near touch sensor 421 (e.g., where the tip contacts or hovers above a screen of a touch sensitive device). A modified stimulation signal can then be transmitted back into touch sensor 421 at the same frequency in phase or at an arbitrary phase (including quadrature) at the same location. The modified stimulation signal can be transmitted back into touch sensor 421 through the tip and/or ring of stylus 401. It should be appreciated that FIG. 4 is a functional block diagram and that the actual components used to implement the various portions of system 400 can vary and one of ordinary skill, given the functional diagram, can select known circuit elements to implement the system.

System 400 can include stylus 401, amplifier 405, processor 407, mixer 406, force sensor 409, touch sensor 421, Cts 423, Ctd 425, Csig 427, drive line 429, sense line 431, multi-stim matrix 443, transmitter channel 445, receiver circuitry 447, and inverse matrix 453 similar or identical to stylus 301, amplifier 305, processor 307, mixer 306, force sensor 309, touch sensor 321, Cts 323, Ctd 325, Csig 327, drive line 329, sense line 331, multi-stim matrix 343, transmitter channel 345, receiver circuitry 347, and inverse matrix 353, respectively. However, touch circuitry 441 can include two demodulation paths. The first demodulation path can include stylus demodulation circuitry 449 and multi-stim decode circuitry 451 for demodulating the touch signal received from receiver circuitry 447 at a first touch phase to generate stylus image 456. The second demodulation path can include touch demodulation circuitry 457 and multi-stim decode circuitry 459 for demodulating the touch signal received from receiver circuitry 447 at a second stylus phase to generate touch image 455, Including a phase shift between the touch and stylus signals further helps to distinguish the touch and stylus signals in addition to the latter having a positive phase. In some examples, the difference between the first and second phases can be 90 degrees. In other examples, the phase difference between the first and second phases can have a different value.

Figure 5:
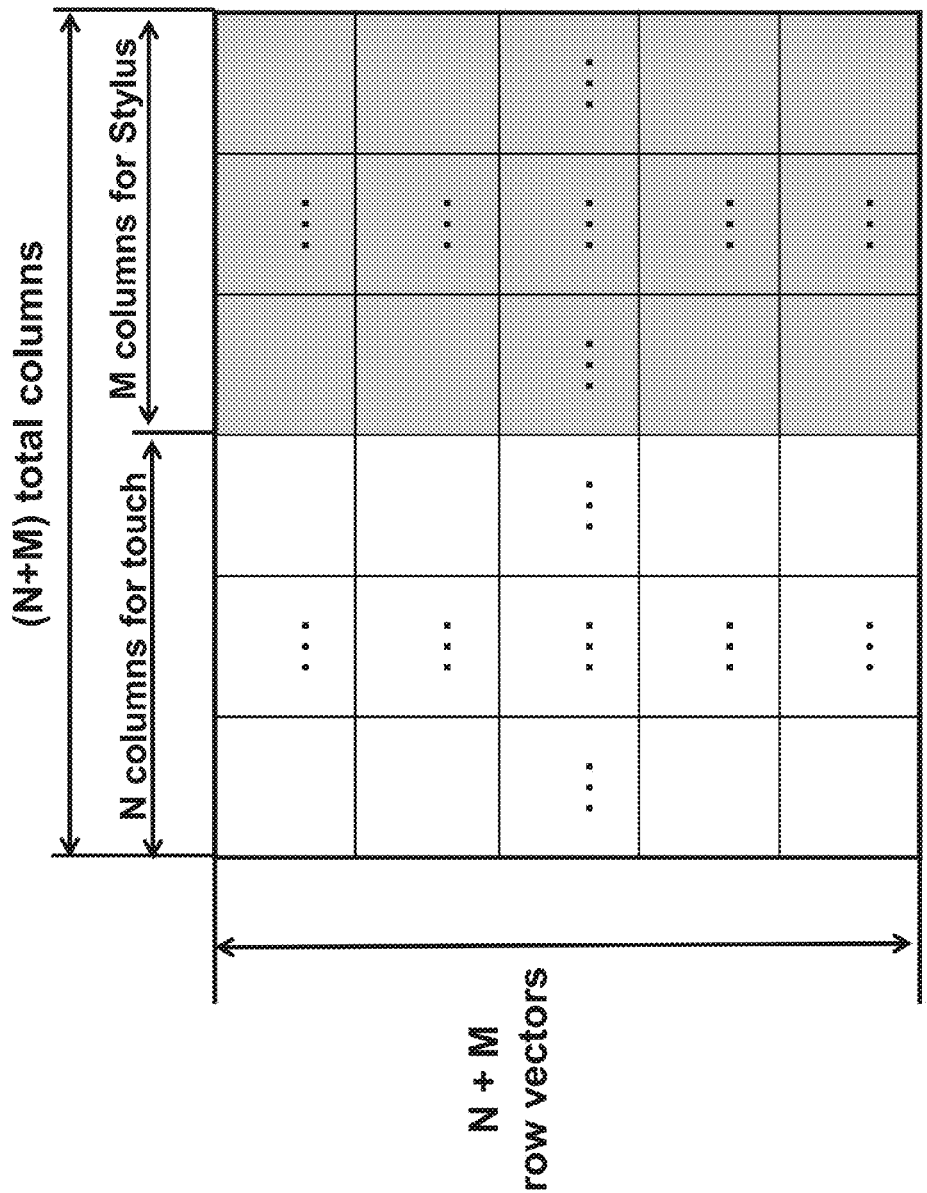
FIG. 5 illustrates an exemplary touch and stylus combo matrix according to various embodiments.
Figure 6:
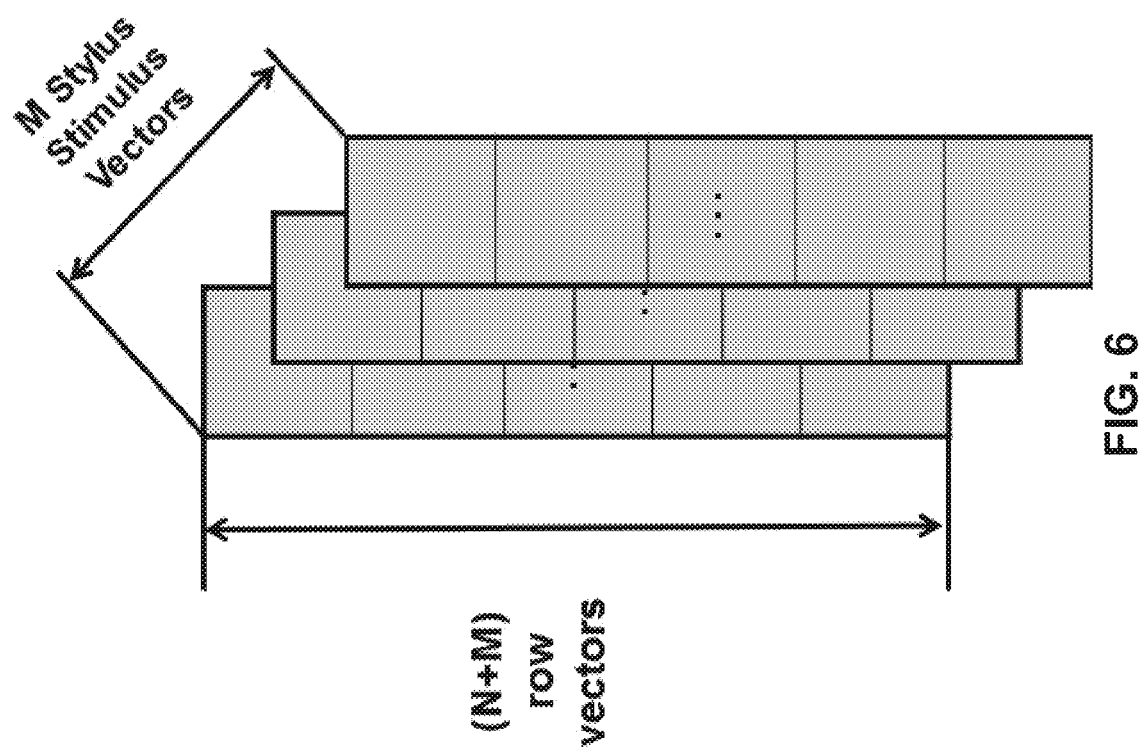
FIG. 6 illustrates exemplary stylus stimulus vectors according to various embodiments.

FIG. 5 illustrates an exemplary touch and stylus stimulus combo matrix that can be used in systems 300 or 400. In this embodiment, a touch stimulus matrix may be extended by M columns and M rows to form the modified touch and stylus stimulus combo matrix. The first N columns may be used for touch stimulus and the M columns may be used for stylus magnitude. Each column vector can correspond to a different channel. In order for the stimulus matrix to be invertible, the matrix should be a square matrix and therefore can be extended by M rows. FIG. 6 illustrates M exemplary stylus stimulus vectors. Each stylus stimulus vector represents a copy of one of the M column vectors from the touch and stylus stimulus combo matrix shown in FIG. 5. Using the touch and stylus stimulus combo matrix, the system can support a total of N styluses.

Figure 7:
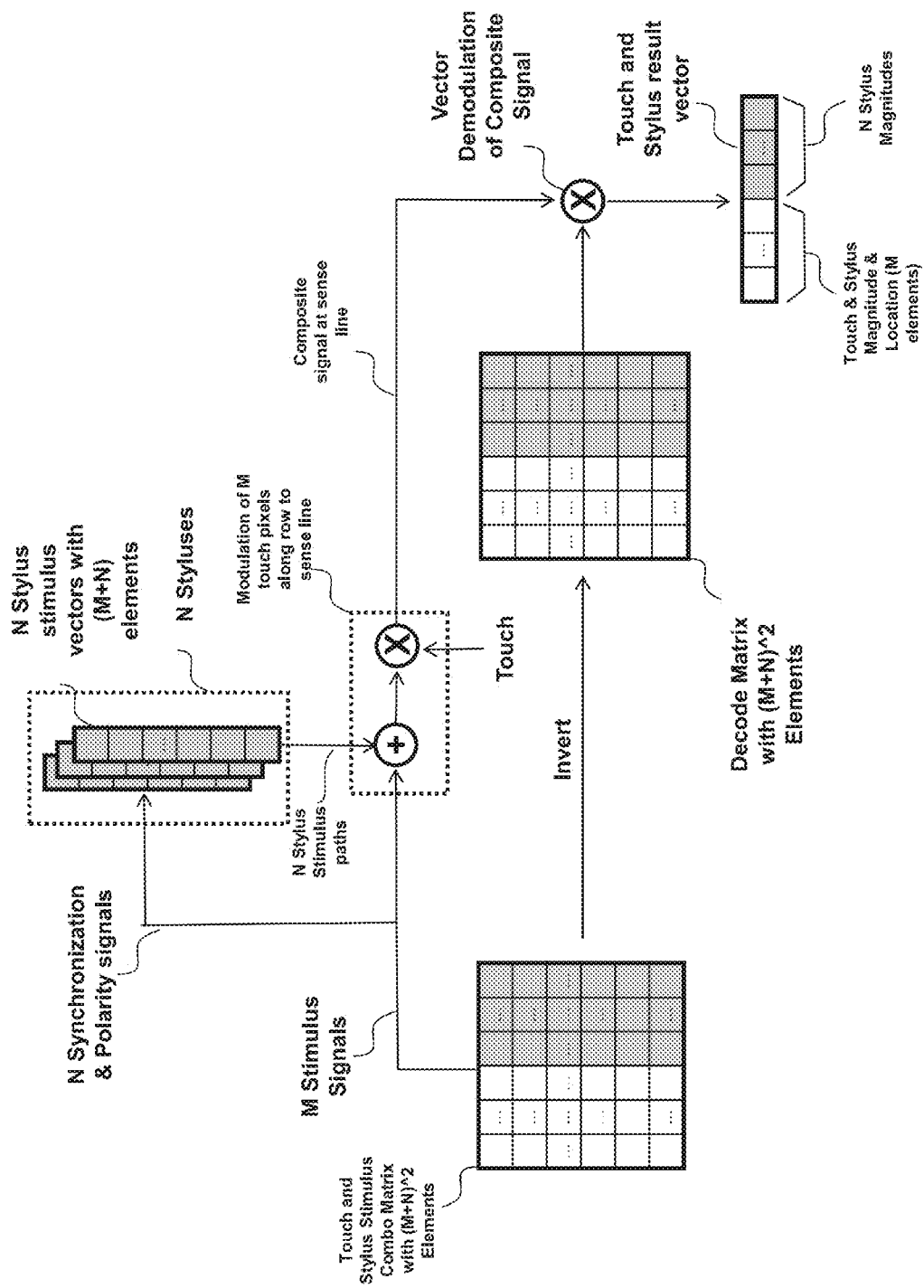
FIG. 7 illustrates an exemplary touch/stylus combo system according to various embodiments.

FIG. 7 illustrates a simplified view of a touch/stylus combo system that utilizes separate channels to encode stylus magnitude. The touch and stylus stimulus combo matrix is extended by N columns and N rows, where N is the number of stylus or devices for which to encode magnitude information. In this example, the touch controller can drive the M drive lines for which touch and stylus location need to be resolved. M touch pixels can be modulated along the M touch pixels along a sense line by touch and up to N stylus devices. The N stylus devices may potentially modulate different touch pixels along a sense line. Each stylus device can have its own stylus stimulus vector, which represents a copy of one of the M column vectors from the touch and stylus stimulus combo matrix. The stylus can modulate the gain of the amplifier (e.g., amplifier 305 or 405) as a function of the stylus stimulus vector or can add its own stimulus signal directly to a given touch pixel (e.g., through the stylus ring). The stimuli from the N styluses can be synchronized in the stylus device by the respective stylus device monitoring the stimulus signal at a given touch panel location and then synchronizing its own stimulus with the received stimulus signal at that touch panel location. For example, synchronization can occur at the first scan step, representing the first row vector in the touch and stylus stimulus combo matrix. In some embodiments, all elements in the first row vector may be 1 (i.e., all M stimulus signals can be driven in positive phase), if the touch and stylus stimulus combo matrix is a hadamard matrix. The stylus device can use this first step to synchronize its own stimulus. The composite signal at the sense line can be vector demodulated with a decode matrix, which represents the inverse of the touch and stylus stimulus combo matrix. The touch and stylus locations can be stored in the touch and stylus result vector, which is comprised of M entries containing M elements indicating the location/magnitude of touch and styluses and N dedicated stylus magnitudes.

In some examples, some or all of the functional blocks of touch circuitry 341 or 441 can be implemented by ASIC processor, ARM processor, other electrical components, or combinations thereof.

Figure 8:
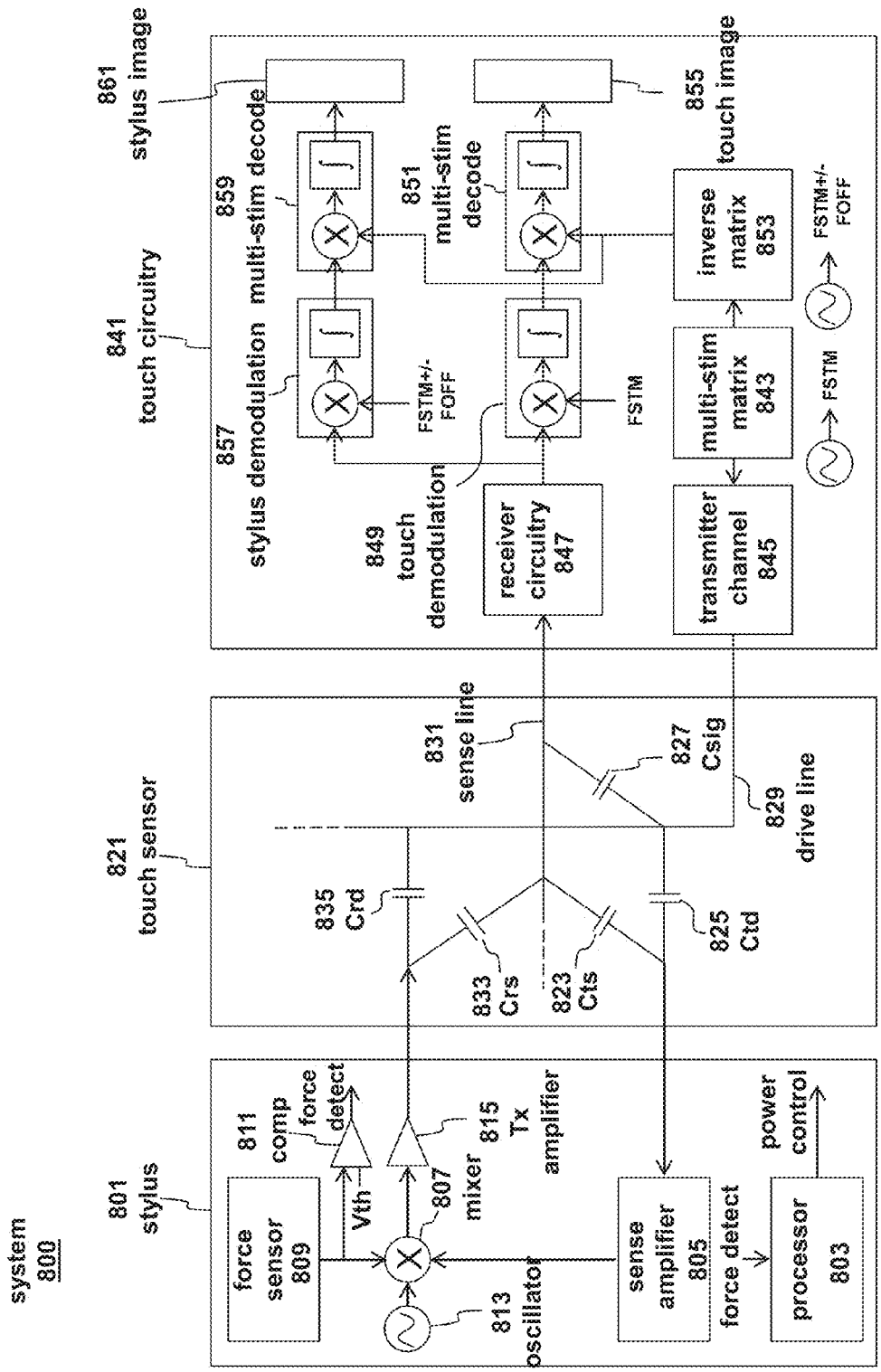
FIG. 8 illustrates a system block diagram showing the interaction between a touch sensitive device and another exemplary stylus according to various embodiments.

FIG. 8 illustrates a functional block diagram of another exemplary system 800 showing the interaction between stylus 801, touch sensor 821, and touch circuitry 841. It should be appreciated that FIG. 8 is a functional diagram and that the actual components used to implement the various portions of system 800 can vary and one of ordinary skill, given the functional diagram, can select known circuit elements to implement the system Stylus 801 is one example of stylus 200 that can be used as an input device to a touch sensitive device having a touch sensor similar or identical to touch sensor 100. Stylus 801 can be configured to generate a stylus stimulation signal having a frequency that is different than a frequency of a stimulation signal generated by the touch sensitive device. In some examples, the stylus stimulation frequency can be between 40-60 KHz (e.g., about 50 Khz) greater than or less than the frequency of a stimulation signal from a touch sensor. Thus, when stylus 801 is used with a touch sensitive device, stylus 801 can cause the touch sensitive device to generate a touch signal containing signals having two or more different frequencies.

Stylus 801 can optionally include sense amplifier 805 coupled to receive a stimulation signal (e.g., a stimulation signal similar or identical to stimulation signal 107) generated by an associated touch sensitive device and transmit a stylus stimulation signal to the associated touch sensitive device. The associated touch sensitive device can include a touch sensitive device in contact with, or in close proximity to, the tip of stylus 801. Sense amplifier 805 can be used to amplify the received stimulation signal to a level sufficient to be used by stylus 801 to generate a stylus stimulation signal, which is described in greater detail below. However, if the strength of the received stimulation signal is sufficiently high, sense amplifier 805 can be omitted from stylus 801.

Stylus 801 can further include force sensor 809 for detecting the amount of force applied to the tip of stylus 801. Force sensor 809 can be similar or identical to force sensor 309, described above. For example, force sensor 809 can include any type of force sensor, such as a capacitive pressure sensor, semiconductor strain gauge, or the like, operable to detect the amount of force applied to the tip of stylus 801. The amount of force detected by force sensor 809 can be used to modulate an oscillating signal generated by oscillator 813. In this way, the magnitude of the oscillating signal generated by oscillator 813 can be adjusted based on how hard the stylus tip is applied to the surface of the associated touch sensitive device. As described above, this allows stylus 801 to convey information associated with the location of its tip on the surface of the touch sensitive device as well as the amount of force being applied to the surface of the touch sensitive device.

Stylus 801 can further include comparator 811 coupled to receive the output of force sensor 809 and a threshold voltage Vth. Comparator 811 can be configured to compare the output of force sensor 809 to the threshold voltage Vth and output a force detection signal based on the comparison. For example, the force detection signal can be driven high (or low, depending on the circuit design) when the output of force sensor 809 is greater than threshold voltage Vth and can be drive low (or high, depending on the circuit design) when the output of force sensor 809 is less than threshold voltage Vth.

Stylus 801 can further include processor 803 coupled to receive the force detection signal output by comparator 811. Processor 803 can be configured to generate a power control signal based on the received force detection signal. For example, if the force detection signal is at a level indicating that the force detected by force sensor 809 is greater than a threshold amount (represented by threshold voltage Vth), processor 803 can drive the power control signal to a high level (or low, depending on the circuit design) to cause oscillator 813 to generate a signal. The force detection signal and the power control signal can be used to control the power state of some or all components within stylus 801 to improve battery life. For example, if the force is below the set force threshold, the device can be in an idle state and the device can remain in a low power state, thereby conserving battery power. When the force is above the force detection threshold, the device can transitions into an active mode. This way battery power can be conserved when the stylus is not actively being used.

Stylus 801 can further include oscillator 813 configured to generate an oscillating signal having frequency $F_{off}$. Oscillator 813 can include any type of oscillator, such as a tuned LC oscillator (e.g., a colpitts-oscillator), crystal oscillator, MEMS based oscillator, voltage controlled oscillator, RC oscillator, ring oscillator, or the like. In one example, oscillator 813 can be configured to generate a sinusoidal signal having an amplitude between 8-12V (e.g., 9, 10, or 11V) and a frequency $F_{off}$ between 80-120 KHz (e.g., 90, 100, or 110 KHz). In other examples, the stimulation signal can have a frequency between 100 KHz to 1 MHz or higher (e.g., between 100-300 KHz or 100-500 KHz). The signal generated by oscillator 813 can have the same phase as the stimulation signal received from touch sensor 821.

Stylus 801 can further include mixer 807 coupled to receive the output of force sensor 809, the signal having frequency $F_{off}$ output by oscillator 813, and the amplified stimulation signal from sense amplifier 805. Mixer 807 can be configured to modulate the amplitude of the signal having frequency $F_{off}$ output by oscillator 813 by an amount corresponding to the force detected by force sensor 809 to generate a modulated oscillating signal. Mixer 807 can be further configured to mix the modulated oscillating signal with the amplified signal received from sense amplifier 805 to generate a stylus stimulation signal. The resultant composite stimulation signal can have a frequency equal to the frequency of the stimulation signal received from touch sensor 821 plus or minus the offset frequency $F_{off}$ amplitude modulated by the force signal.

Stylus 801 can further include transmission amplifier 815 coupled to receive the stylus stimulation signal output by mixer 807. Amplifier 815 can be configured to amplify the composite stimulation signal by an amount sufficient to be received by touch sensor 821.

System 800 can further include touch sensor 821 of a touch sensitive device. Touch sensor 821 can include a touch sensor similar or identical to touch sensor 100, described above. As shown in FIG. 8, touch sensor 821 can include a drive line 829 coupled to receive a stimulation signal similar or identical to stimulation signal 107 from touch circuitry 841 and a sense line 831 capacitively coupled to drive line 829 and coupled to transmit a touch signal similar or identical to touch signal 109 to touch circuitry 841. It should be appreciated that touch sensor 821 is shown with only one drive line and one sense line for illustrative purposes only and that touch sensor 821 can actually include any number of drive lines and any number of sense lines.

A mutual capacitance Csig 827 can be formed between the crossing drive line 829 and sense line 831 when the drive line is stimulated. Similarly, a mutual capacitance Cts 823 and Ctd 825 can be formed between the tip of stylus 801 and sense line 831 and drive line 829, respectively, when the stylus stimulation signal is generated. A mutual capacitance Crs 833 and Crd 835 can also be formed between the ring of stylus 801 and sense line 831 and drive line 829, respectively, when the composite stylus stimulation signal is generated. As mentioned above, if the tip of stylus 801 is placed at the crossing point between drive line 829 and sense line 831, stylus 801 can receive the stimulation signal transmitted on drive line 829 via the capacitive path formed between the stylus tip and drive line 829, amplify the received stimulation signal using sense amplifier 805, mix the amplified stimulation signal with a modulated oscillating signal generated by modulating a signal having frequency $F_{off}$ by an amount corresponding to a force detected by force sensor 809, and transmit the stylus stimulation signal back into touch sensor 821 via the capacitive path formed between the stylus ring and sense line 831. Thus, the touch signal generated by sense line 831 can include charge coupled from both drive line 829 and stylus 801.

System 800 can further include touch circuitry 841 included in or associated with the touch sensitive device. Touch circuitry 841 can be similar to touch circuitry 341, described above, except that touch demodulation circuitry 849 and multi-stim decode circuitry 851 can be configured to demodulate the touch component of the signal output by receiver circuitry 847 and post the result in a touch image memory 855. Touch circuitry 841 can further include stylus demodulation circuitry 857 and multi-stim decode circuitry 859 to demodulate the stylus component of the signal output by receiver circuitry 847 and post the result to stylus image memory 861. In the illustrated example, stylus demodulation can occur at FSTM+/−FOFF, since the received signal on the stylus device can be FSTM and modulated with FOFF to generate the stylus signal. The touch demodulation can be performed at FSTM. Multi-stim matrix 843, transmitter channel 845, receiver circuitry 847, and inverse matrix 853 can be similar or identical to multi-stim matrix 343, transmitter channel 345, receiver circuitry 347, and inverse matrix 353 of touch circuitry 341, respectively. However, multi-stim matrix 843 and inverse matrix 853 may not include an extra row and step like that contained in multi-stim matrix 343 and inverse matrix 353. The differences between touch circuitry 341 and touch circuitry 841 will now be described in more detail.

Touch circuitry 841 can include separate demodulation and decode circuitry for handling stylus touch events and non-stylus touch events. Specifically, touch circuitry 841 can include touch demodulation circuitry 849 and multi-stim decode circuitry 851 to process non-stylus touch events and can include stylus demodulation circuitry 857 and multi-stim decode circuitry 859 to process stylus touch events.

Touch demodulation circuitry 849 can be configured to demodulate the portion of the touch signal received from receiver circuitry 847 having a frequency corresponding to the frequency of the stimulation signal generated by transmitter channel 845. Touch demodulation circuitry 849 can include a demodulation mixer and a demodulation integrator to extract the touch component of the signal output by sense line 831 having the frequency corresponding to the frequency of the stimulation signal generated by transmitter channel 845.

Multi-stim decode circuitry 851 can be configured to decode the touch component of the signal received from touch demodulation circuitry 849. Multi-stim decode circuitry 851 can include a mixer coupled to multiply the touch component of the signal received from touch demodulation circuitry 849 with inverse multi-stim matrix 853. Multi-stim decode circuitry 851 can further include an integrator coupled to receive the output of the mixer and to post the result in a touch image memory 855, representing a non-stylus touch detected by sense line 831 of touch sensor 821.

Stylus demodulation circuitry 857 can be configured to demodulate the portion of the touch signal received from receiver circuitry 847 having a frequency corresponding to the frequency of the stimulation signal generated by transmitter channel 845 plus or minus the offset frequency $F_{off}$. Stylus demodulation circuitry 857 can include a demodulation mixer and a demodulation integrator to extract the stylus component of the signal output by sense line 831 having the frequency corresponding to the frequency of the stimulation signal generated by transmitter channel 845 plus or minus the offset frequency $F_{off}$.

Multi-stim decode circuitry 859 can be configured to decode the stylus component of the signal received from stylus demodulation circuitry 857. Multi-stim decode circuitry 859 can include a mixer coupled to multiply the stylus component of the touch signal received from stylus demodulation circuitry 857 with inverse multi-stim matrix 853. Multi-stim decode circuitry 859 can further include an integrator coupled to receive the output of the mixer and to post the result in a touch image memory 861, representing a stylus touch detected by sense line 831 of touch sensor 821.

In some examples, the functional blocks of touch circuitry 841 can be implemented by ASIC processor, ARM processor, other electrical components, or combinations thereof.

While system 800 is shown and described above as using one signal having an offset frequency $F_{off}$, it should be appreciated that any number of these signals can be used. For example, stylus 801 can include any number of additional oscillators to generate additional signals to be modulated by an amount corresponding to the force detected by force sensor 809. These additional signals can have varying frequencies and can each be mixed with the amplified stimulation signal received from sense amplifier 805 (or non-amplified stimulation signal received from touch sensor 821 if no sense amplifier 805 is used) to generate the stylus stimulation signal. In this example, touch circuitry 841 can also include additional circuitry to process the additional signals generated by stylus 801. For example, touch circuitry can include additional I-phase demodulations circuits and multi-stim decoder circuits for each additional signal to be demodulated.

Figure 9:
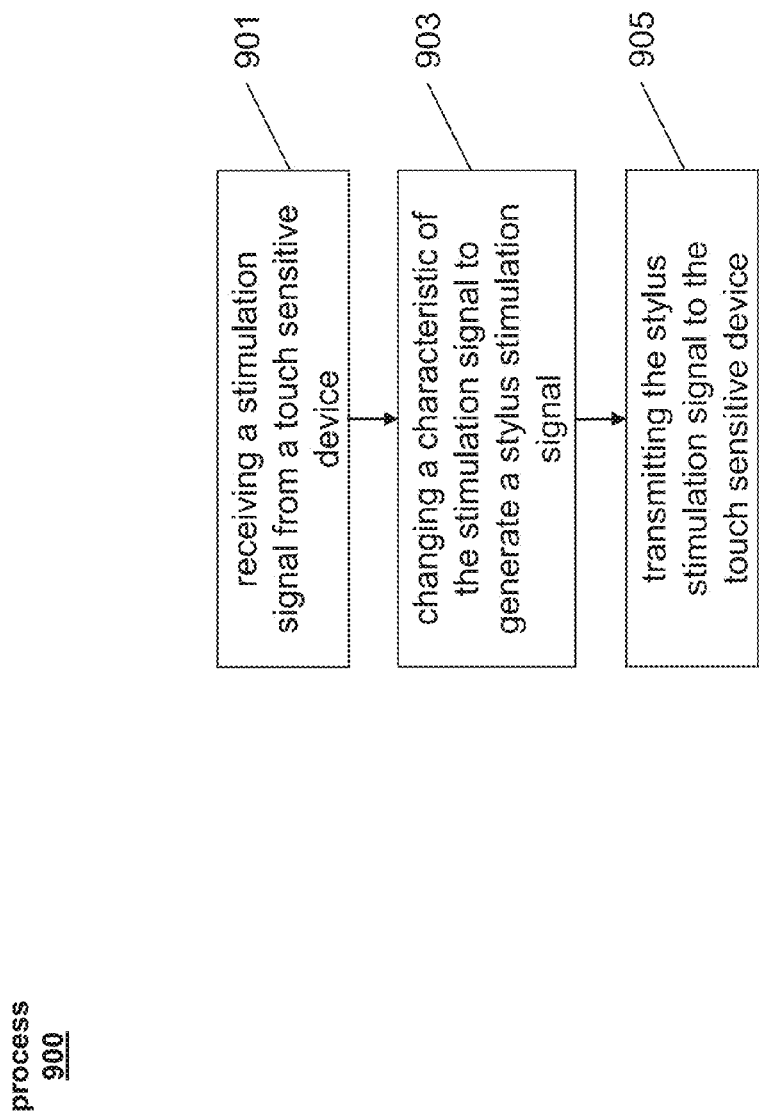
FIG. 9 illustrates an exemplary process for generating a stylus stimulation signal according to various embodiments.

FIG. 9 illustrates an exemplary process 900 for generating and transmitting a stylus stimulation signal. At block 901, a stimulation signal can be received by a stylus from a touch sensitive device. The stimulation signal can be received by capacitively coupling a portion of the stylus to the touch sensitive device. In one example, a stimulation signal similar or identical to stimulation signal 107 can be generated by a touch sensitive device similar or identical to those shown in FIGS. 3, 4, and 8. The stimulation signal can be generated by a transmitter channel similar or identical to transmitter channels 345, 445, or 845 using a multi-stim matrix similar or identical to multi-stim matrix 343, 443, or 843. The stimulation signal can be sent through a drive line similar or identical to drive lines 329, 429, or 829 of a touch sensor similar or identical to touch sensors 321, 421, or 821. A stylus similar or identical to stylus 200, 301, 401, or 801 having a tip similar or identical to tip 201 can receive the stimulation signal via a capacitive path formed between the drive line and the tip of the stylus when the stylus tip is placed on or near the touch sensitive surface of the touch sensitive device.

At block 903, a stylus stimulation signal can be generated by changing a characteristic of the received stimulation signal. For example, one or more of a frequency or amplitude of the received stimulation signal can be changed to generate the stylus stimulation signal.

In one example, an amplifier similar or identical to amplifier 305 or 405 including a regenerative amplifier can be used to amplify the received stimulation signal. The amplification can be based on an amount of force detected by a force sensor similar or identical to force sensor 309 or 409 and a gain vector generated by processor similar or identical to processor 307 or 407. The force sensor can detect the amount of force being applied to the tip of the stylus. In this way, the magnitude of the stylus stimulation signal can be varied by adjusting the amount of force being applied between the stylus tip and the surface of the touch sensitive device.

In another example, an oscillator and mixer similar or identical to oscillator 813 and mixer 807 can be used to change a frequency of the received stimulation signal. In this example, the oscillator can be configured to generate an oscillating signal (e.g., a sinusoidal signal) having a frequency that is different from that of the received stimulation signal. In some examples, the oscillator can be configured to turn on in response to a sufficient force being applied to the tip of the stylus as detected by a force sensor similar or identical to force sensor 809. The stylus signal generated by the oscillator can modulated at a mixer similar or identical to mixer 807 by an output of the force sensor such that the amplitude of the amplitude modulated stylus stimulation signal corresponds to an amount of force detected by the force sensor. The amplitude modulated oscillating signal can be mixed with the received stimulation signal by a mixer similar or identical to mixer 807 to generate a stylus stimulation signal. In some examples, prior to mixing with the amplitude modulated stylus stimulation signal, the received stimulation signal can be amplified using an amplifier to increase the signal strength to a desirable amount. For example, an amplifier similar or identical to sense amplifier 805 can be used to amplify the received stimulation signal.

At block 905, the stylus stimulation signal can be transmitted to the touch sensitive device. For example, the stylus stimulation signal generated at block 903 can be transmitted to the touch sensitive device via a capacitive path formed between the stylus device and the touch sensor of the device.

In one example, an amplitude-modulated stylus stimulation signal generated by a stylus similar or identical to stylus 301 or 401 can be transmitted to a touch sensor similar or identical to touch sensor 321 or 421 of a touch sensitive device via a capacitive path formed between the stylus device and the touch sensor of the device.

In another example, a frequency-shifted composite stylus stimulation signal generated by a stylus similar or identical to stylus 801 can be transmitted to a touch sensor similar or identical to touch sensor 821 of a touch sensitive device via a capacitive path formed between the stylus device and the touch sensor of the device. The frequency-shifted composite stylus stimulation signal can be amplified prior to transmission using a transmission amplifier similar or identical to transmission amplifier 815.

Figure 10:
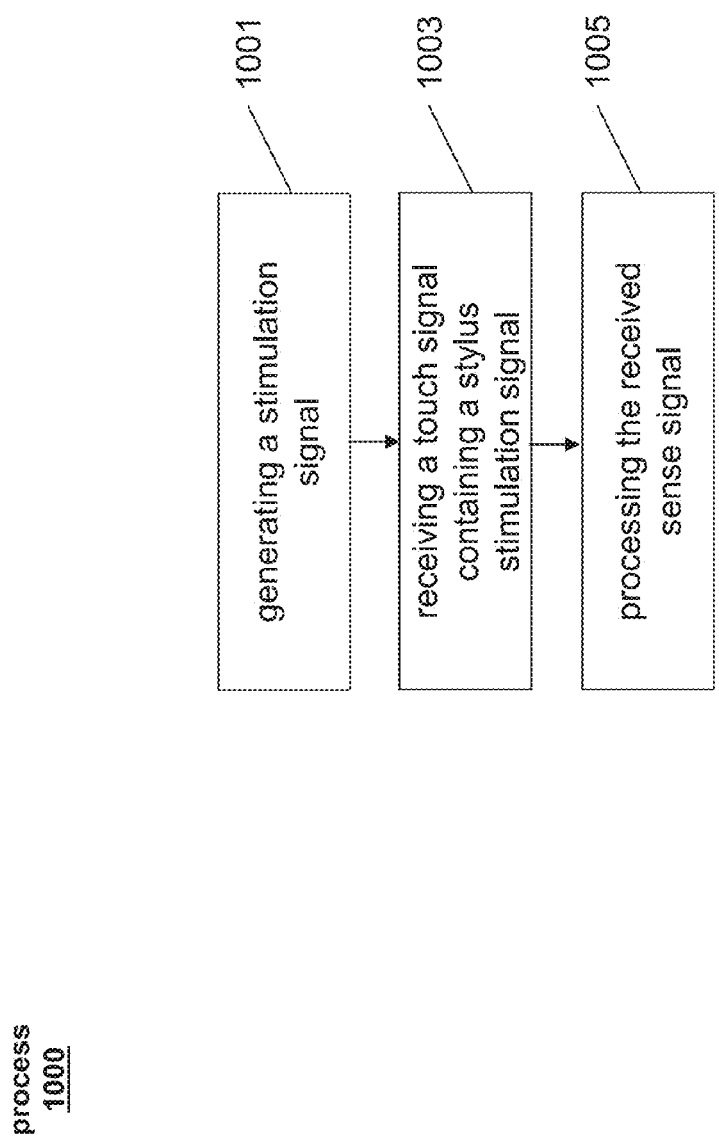
FIG. 10 illustrates an exemplary process for processing a stylus stimulation signal according to various embodiments.

FIG. 10 illustrates an exemplary process 1000 for receiving and processing a touch signal having a stylus stimulation signal. At block 1001, a stimulation signal can be generated by a touch sensitive device. The stimulation signal can be transmitted to drive lines of a touch sensor. In one example, a stimulation signal similar or identical to stimulation signal 107 can be generated by a touch sensitive device similar or identical to those shown in FIGS. 3, 4, and 8. The stimulation signal can be generated by a transmitter channel similar or identical to transmitter channels 345, 445, or 845 using a multi-stim matrix similar or identical to multi-stim matrices 343, 443, or 843. The stimulation signal can be sent through a drive line similar or identical to drive lines 329, 429, or 829 of a touch sensor similar or identical to touch sensors 321, 421, or 821.

At block 1003, a touch signal having a stylus stimulation signal can be received by the touch sensitive device. The touch signal can represent a detected touch event on a touch sensitive surface of the touch sensitive device. In one example, a touch signal similar or identical to touch signal 109 can be received from a sense line similar or identical to sense line 331, 431, or 831 of a touch sensor similar or identical to touch sensor 321, 421, or 821. The touch signal can contain a stylus stimulation signal generated by a stylus similar or identical to stylus 301, 401, or 801. The stylus stimulation signal can be an amplitude-modulated and/or frequency-shifted version of the stimulation signal.

At block 1005, the received sense signal can be processed. For example, the received sense signal can be filtered, converted from an analog to a digital signal, amplified, or combinations thereof. The signal can further be demodulated and decoded to generate a touch image representing a touch event detected by the touch sensor. In one example, a receiver circuitry similar or identical to receiver circuitry 347, 447, or 847 can be used to filter, convert the signal from an analog to a digital signal, amplify, or combinations thereof, the received sense signal.

In one example, the signal output by the receiver circuitry, such as receiver circuitry 347, can be sent through demodulation circuitry similar or identical to demodulation circuitry 349 to extract the I-phase component of the touch signal. The demodulated signal can be transmitted to decode circuitry similar or identical to multi-stim decode circuitry 351 to generate a touch image similar or identical to touch image 355. In another example, the signal output by the receiver circuitry, such as receiver circuitry 447, can be sent through demodulation circuitry similar or identical to touch demodulation circuitry 457 and stylus demodulation circuitry 449 to extract the touch and stylus components of the touch signal. The demodulated signals can be transmitted to decode circuitry similar or identical to multi-stim decode circuitry 451 and 459 to generate a stylus image similar or identical to stylus image 456 and a touch image similar or identical to touch image 455.

In another example, the signal output by receiver circuitry, such as receiver circuitry 847, can be sent through two or more sets of demodulation circuitry similar or identical to touch and stylus demodulation circuitry 849 and 857 to extract the touch and stylus components of the touch signal. The touch demodulation circuitry 849 can be configured to demodulate the signal output by the receiver circuitry at a frequency corresponding to the frequency of the signal transmitted at block 1001. The stylus demodulation circuitry 857 can be configured to demodulate the signal output by the receiver circuitry at the frequency corresponding to the frequency of the signal transmitted at block 1001 plus or minus an offset frequency corresponding to a frequency of an oscillating signal generated by the stylus device. If the stylus is configured to generate more than one oscillating signal, additional demodulation circuits can be used to demodulate the signal output by the receiver circuitry at frequencies corresponding to the frequency of the signal transmitted at block 1001 plus or minus offset frequencies corresponding to frequencies of the additional oscillating signals. The demodulated signal can be transmitted to decode circuitry similar or identical to multi-stim decode circuitry 851 or 859. Additional decode circuitry can be included if additional demodulation circuits are used. The multi-stim decode circuitry can be used to generate touch images similar or identical to touch and stylus images 855 and 861.

Using styluses 301, 401, and 801 or processes 900 or 1000, a stylus device can be used to input both positional data and pressure into a touch sensitive device. These inputs can be used to improve a user experience in various applications. For example, in a drawing application, a user can use the stylus as a paintbrush, with the stylus' motion and pressure being detected by the touch sensitive device. As the user increases the pressure of the stylus against the touch sensitive device, the thickness of the brushstrokes can be increased. As the user reduces the pressure of the stylus against the touch sensitive device, the thickness of the brushstrokes can similarly decrease. In another example, when drawing with a line rather than a brush, the line thickness can change as a function of pressure. Similarly, when using the stylus as an eraser, the eraser width can vary as a function of pressure.

Figure 11:
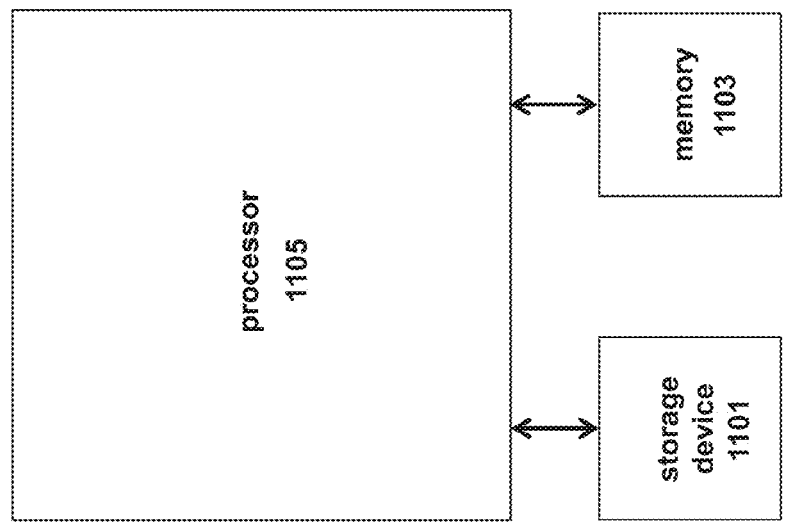
FIG. 11 illustrates an exemplary system for generating or processing a stylus stimulation signal according to various embodiments.

One or more of the functions relating to the generation or processing of a stylus stimulation signal described above can be performed by a system similar or identical to system 1100 shown in FIG. 11. System 1100 can include instructions stored in a non-transitory computer readable storage medium, such as memory 1103 or storage device 1101, and executed by processor 1105. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The system 1100 shown in FIG. 11 can be used in either the stylus to generate a stylus stimulation signal as described above with respect to FIGS. 3, 4, 8, and 9, or the touch sensitive device to receive and process a touch signal as described above with respect to FIGS. 3, 4, 8, and 10.

It is to be understood that the system is not limited to the components and configuration of FIG. 11, but can include other or additional components in multiple configurations according to various embodiments. Additionally, the components of system 1100 can be included within a single device, or can be distributed between multiple devices.

Figure 12:
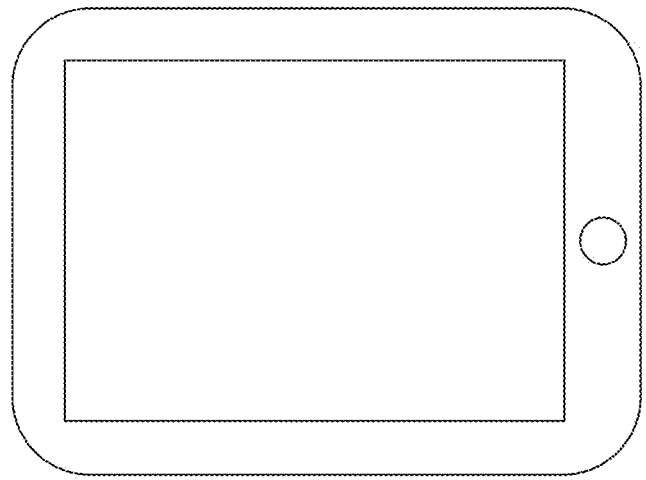
FIG. 12 illustrates an exemplary personal device that includes a touch sensor according to various embodiments.

FIG. 12 illustrates an exemplary personal device 1200, such as a tablet, that can be used with a stylus according to various embodiments.

Figure 13:
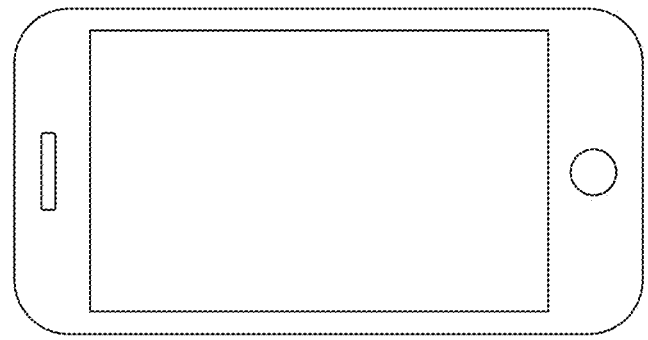
FIG. 13 illustrates another exemplary personal device that includes a touch sensor according to various embodiments.

FIG. 13 illustrates another exemplary personal device 1300, such as a mobile phone, that can be used with a stylus according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A stylus comprising:
   a stylus tip capable of receiving a stimulation signal from a touch sensitive device and further capable of transmitting a stylus stimulation signal to the touch sensitive device;
   a force sensor circuit capable of detecting a force applied to the stylus tip;

an amplification circuit coupled to receive the stimulation signal from the stylus tip, the amplification circuit comprising a processor and an amplifier, the processor coupled to receive an output signal from the amplifier and capable of generating a gain signal, wherein the amplification circuit is capable of modulating the received stimulation signal to generate the stylus stimulation signal based on the gain signal and the force detected by the force sensor circuit; and a mixer circuit coupled to receive the gain signal and an output from the force sensor circuit and capable of controlling the amount of amplification applied to the received stimulation signal based on the output from the force sensor circuit and the gain signal.

2. The stylus of claim 1, wherein a phase and a frequency of the stylus stimulation signal are at least substantially equal to a phase and a frequency of the stimulation signal from the touch sensitive device.

3. The stylus of claim 1, wherein the amplification circuit comprises a regenerative or super regenerative amplifier, and wherein a quench rate of the super regenerative amplifier is synchronous to at least a portion of the received stimulation signal and a gain of the super regenerative amplifier is based on the received stimulation signal.

4. The stylus of claim 1, wherein the amplification circuit further comprises a plurality of capacitive elements switchably coupled between an input and an output of the amplifier and the gain signal selectively couples one or more of the plurality of capacitive elements to modulate an amplitude of the received stimulation signal.

5. The stylus of claim 1, wherein the amplification circuit further comprises a plurality of capacitive elements switchably coupled between an input and an output of the amplifier and the force sensor circuit is capable of adjusting the capacitance of one or more of the plurality of capacitive elements based on the amount of force applied to the stylus tip.

6. A method comprising:
receiving a stimulation signal from a touch-sensitive device;
generating a stylus stimulation signal based on the received stimulation signal and a force detected by a force sensor, wherein generating the stylus stimulation signal comprises
generating a gain vector using a processor receiving an amplified version of the received stimulation signal,
modulating an amplitude of the received stimulation signal based at least in part on the output of a mixer circuit, wherein the mixer is coupled to receive the gain vector and an output from the force sensor; and
transmitting the generated stylus stimulation signal to the touch-sensitive device.

7. The method of claim 6, wherein generating the stylus stimulation signal further comprises selectively coupling one or more capacitive elements between the input and output of an amplifier based on the gain vector to modulate the amplitude of the received stimulation signal.

8. The method of claim 6, wherein generating the stylus stimulation signal comprises modulating the amplitude of the received stimulation signal using a regenerative amplifier.

* * * * *